US010980255B2

(12) United States Patent
Yamada et al.

(10) Patent No.: US 10,980,255 B2
(45) Date of Patent: *Apr. 20, 2021

(54) FOOD PRESERVATION METHOD, FOOD FILM, FOOD CONTAINER, AND FOOD HANDLING METHOD

(71) Applicant: Sharp Kabushiki Kaisha, Sakai (JP)

(72) Inventors: Miho Yamada, Sakai (JP); Kiyoshi Minoura, Sakai (JP); Takahiro Nakahara, Sakai (JP); Kouji Kusumoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 510 days.

This patent is subject to a terminal disclaimer.

(21) Appl. No.: 15/539,631

(22) PCT Filed: Dec. 21, 2015

(86) PCT No.: PCT/JP2015/085666
§ 371 (c)(1),
(2) Date: Jun. 23, 2017

(87) PCT Pub. No.: WO2016/104421
PCT Pub. Date: Jun. 30, 2016

(65) Prior Publication Data
US 2018/0255809 A1   Sep. 13, 2018

(30) Foreign Application Priority Data

Dec. 25, 2014   (JP) .............................. JP2014-261994

(51) Int. Cl.
*A23B 4/00*   (2006.01)
*A23L 3/00*   (2006.01)
(Continued)

(52) U.S. Cl.
CPC .................. *A23L 3/00* (2013.01); *A23B 4/00* (2013.01); *A23B 4/10* (2013.01); *A23B 7/00* (2013.01);
(Continued)

(58) Field of Classification Search
CPC ............ B29C 2059/023; B29C 59/023; B29C 59/026; B29L 2007/001; B81B 2203/0361;
(Continued)

(56) References Cited

U.S. PATENT DOCUMENTS 3,151,989 A * 10/1964 Underwood ....... B65D 81/3415
426/106
5,112,674 A *  5/1992 German ................ B32B 27/322
428/216
(Continued)

FOREIGN PATENT DOCUMENTS

CN   201329050 A   10/2009
JP   H08-024843 A    1/1996
(Continued)

OTHER PUBLICATIONS

Formal Human Translation of Nobuhiko Imai et al. JP 2013208817. Published 2013. (Year: 2013).*
(Continued)

*Primary Examiner* — Lee E Sanderson
(74) *Attorney, Agent, or Firm* — ScienBiziP, P.C.

(57) ABSTRACT

A food preserving method is a method for preserving food using a food film (34A), (34B). The food film (34A), (34B) has a surface which has a plurality of raised portions (34Ap), (34Bp). The two-dimensional size of the plurality of raised portions (34Ap), (34Bp) is in a range of more than 20 nm and less than 500 nm when viewed in a direction normal to the food film (34A), (34B). The method includes bringing the food into direct contact with the surface.

22 Claims, 14 Drawing Sheets

(51) Int. Cl.
  *B65D 65/38* (2006.01)
  *B65D 75/28* (2006.01)
  *A23B 7/00* (2006.01)
  *B65D 81/28* (2006.01)
  *A23B 4/10* (2006.01)
  *A23B 7/16* (2006.01)

(52) U.S. Cl.
  CPC ............... *A23B 7/16* (2013.01); *B65D 65/38* (2013.01); *B65D 75/28* (2013.01); *B65D 81/28* (2013.01); *A23V 2002/00* (2013.01)

(58) Field of Classification Search
  CPC .... A23B 4/00; A23B 4/10; A23B 7/00; A23B 7/16; A23B 3/00; B65D 65/38; B65D 75/28; B65D 81/24; B65D 81/28; B82Y 10/00; B82Y 40/00; B82Y 30/00; A01N 25/34; Y10T 428/1334; Y10T 428/1352; Y10T 428/1355; Y10T 428/1359; Y10T 428/1379; Y10T 428/1383; Y10T 428/139; Y10T 428/1393; Y10T 428/1397
  USPC ............................................... 428/34.1–36.92
  See application file for complete search history.

(56) References Cited

U.S. PATENT DOCUMENTS

| | | |
|---|---|---|
| 2003/0205475 A1 | 11/2003 | Sawitowski |
| 2007/0159698 A1 | 7/2007 | Taguchi et al. |
| 2010/0203161 A1 | 8/2010 | Gehri et al. |
| 2011/0235181 A1 | 9/2011 | Hayashibe et al. |
| 2011/0281068 A1 | 11/2011 | David et al. |
| 2012/0318772 A1 | 12/2012 | Minoura et al. |
| 2013/0057958 A1 | 3/2013 | Minoura et al. |
| 2014/0077418 A1 | 3/2014 | Otani et al. |
| 2015/0140154 A1 | 5/2015 | Isurugi et al. |
| 2015/0168610 A1 | 6/2015 | Fukui et al. |
| 2015/0273755 A1 | 10/2015 | Yee et al. |
| 2016/0113274 A1 | 4/2016 | Yamada et al. |
| 2016/0212989 A1* | 7/2016 | Juodkazis ............. A01N 25/34 |

FOREIGN PATENT DOCUMENTS

| | | |
|---|---|---|
| JP | H08-300549 A | 11/1996 |
| JP | H11-010724 A | 1/1999 |
| JP | 2001-219464 A | 8/2001 |
| JP | 2001-310412 A | 11/2001 |
| JP | 2002-012257 A | 1/2002 |
| JP | 2005-055114 A | 3/2005 |
| JP | 2008-197217 A | 8/2008 |
| JP | 4265729 B2 | 2/2009 |
| JP | 2009-166502 A | 7/2009 |
| JP | 2010-000719 A | 1/2010 |
| JP | 2010-079200 A | 4/2010 |
| JP | 2012-078438 A | 4/2012 |
| JP | 2012-514239 A | 6/2012 |
| JP | 2013-033287 A | 2/2013 |
| JP | 2013-078573 A | 5/2013 |
| JP | 2013-208817 A | 10/2013 |
| JP | 2014-029391 A | 2/2014 |
| JP | 2014-066975 A | 4/2014 |
| JP | 2014-202955 A | 10/2014 |
| JP | 2015-024549 A | 2/2015 |
| JP | 5788128 B1 | 9/2015 |
| WO | 2011/125486 A1 | 10/2011 |
| WO | 2011/148721 A1 | 12/2011 |
| WO | 2013/183576 A1 | 12/2013 |
| WO | 2013/191092 A1 | 12/2013 |
| WO | 2014/021376 A1 | 2/2014 |
| WO | 2014/171365 A1 | 10/2014 |

OTHER PUBLICATIONS

Hills, Brian Andrew. The Biology of Surfactant, Cambridge University Press, 1998 (Year: 1998).*
U.S. Appl. No. 14/771,833.
U.S. Appl. No. 15/386,131.
U.S. Appl. No. 15/437,044.
U.S. Appl. No. 15/592,922.
U.S. Appl. No. 14/897,252.
U.S. Appl. No. 15/126,078.
Elena P. Ivanova, Jafar Hasan, Hayden K. Webb, Gediminas Gervinskas, Saulius Juodkazis, Vi Kanh Truong, Alex H.F Wu, Robert N. Lamb, Vladimir A. Baulin, Gregory S. Watson, Jolanta A. Watson, David E. Mainwaring & Russell J. Crawford, Bactericidal activity of black silicon, Nature Communications, Jun. 7, 2013, Article No. 2838 (2013), DOI: 10.1038/ncomms3838.
Alexander K. Epstein, Tak-Sing Wong, Rebecca A. Belisle, Emily Marie Boggs, Joanna Aizenberg, Liquid-infused structured surfaces with exceptional anti-biofouling performance, Proc Natl Acad Sci U S A. Aug. 14, 2012; 109(33): 13182-13187. doi: 10.1073/pnas.1201973109.
Elena P. Ivanova, Jafar Hasan, Hayden K. Webb, Vi Khanh Truong, Gregory S.Waston, Jolanta A. Watson, Vladimir A. Baulin, Sergey Pogodin, James Y. Wang, Mark J. Tobin, Christian Lobbe and Russell J.Crawford, Natural Bactericidal Surfaces: Mechanical Rupture of Pseudomonas aeruginosa Cells by Cicada Wings,Small. Aug. 20, 2012;8(16):2489-94. doi: 10.1002/smll.201200528.
Chang Yao, Thomas J. Webster, Matthew Hedrick,Decreased bacteria density on nanostructured polyurethane. J Biomed Mater Res Part A 2014:102A:1823-1828.
Cleaning Guide-How to Clean Surface,http://www.goodhousekeeping.com/home/cleaning/tips/a18875/how-to-clean, Sep. 7, 2011.
MIT's anti-microbial 'paint' kills flu,bacteria,Anne Trafton, Nov. 30, 2006,http://chemistry.mit.edu/mlts-anti-microblal-paint-kills-flu-bacteria.
Pogodin, et. al., Biophysical Model of Bacterial Cell Interactions with Nanopatterned Cicada Wing Surfaces, Biophysical Journal, vol. 104, pp. 835-840 (Feb. 2013). Biophysical.

* cited by examiner (a)

(b)

(a)

(b)

(c)

(a)

(b)

(c)

(d)

(a)

(b)

(c)

(d)

(e)

(f)

(a)

(b)

(c)

(a)

(b)

(c)

(a)

(b)

(a)

(b)

FOOD PRESERVATION METHOD, FOOD FILM, FOOD CONTAINER, AND FOOD HANDLING METHOD

TECHNICAL FIELD

The present invention relates to a synthetic polymer film whose surface has a microbicidal activity, a sterilization method with the use of the surface of the synthetic polymer film, a mold for production of the synthetic polymer film, and a mold manufacturing method, and particularly to a method for preserving food using such a synthetic polymer film, a food film, a food container, and a method for handling food. In this specification, the "mold" includes molds that are for use in various processing methods (stamping and casting), and is also referred to as a stamper. The "mold" can also be used for printing (including nanoimprinting).

BACKGROUND ART

Recently, it was reported that surficial nanostructures of black silicon, wings of cicadas and dragonflies have a bactericidal activity (Non-patent Document 1). Reportedly, for example, black silicon has 500 nm tall nanopillars, and the physical structure of the nanopillars produces a bactericidal activity. Wings of cicadas and dragonflies have 240 nm tall nanopillars.

According to Non-patent Document 1, black silicon has the strongest bactericidal activity on Gram-negative bacteria, while wings of dragonflies have a weaker bactericidal activity, and wings of cicadas have a still weaker bactericidal activity. The static contact angle (hereinafter, also simply referred to as "contact angle") of the black silicon surface with respect to water is 80°, while the contact angles of the surface of wings of dragonflies and cicadas with respect to water are 153° and 159°, respectively.

CITATION LIST

Patent Literature

Patent Document 1: Japanese Patent No. 4265729
Patent Document 2: Japanese Laid-Open Patent Publication No. 2009-166502
Patent Document 3: WO 2011/125486
Patent Document 4: WO 2013/183576

Non-Patent Literature

Non-patent Document 1: Ivanova, E. P. et al., "Bactericidal activity of black silicon", Nat. Commun. 4:2838 doi: 10.1038/ncomm3838 (2013).

SUMMARY OF INVENTION

Technical Problem

The mechanism of killing bacteria by nanopillars is not clear from the results described in Non-patent Document 1. It is also not clear whether the reason why black silicon has a stronger bactericidal activity than wings of dragonflies and cicadas resides in the difference in height or shape of nanopillars, or in the difference in surface free energy (which can be evaluated by the contact angle). Also, it is not specifically researched on what bacteria the nanopillars cause bactericidal activity. For example, the bactericidal activity of the nanopillars on food is unknown.

The bactericidal activity of black silicon is difficult to utilize because black silicon is poor in mass productivity, and is hard but brittle so that the shapability is poor.

The present invention was conceived for the purpose of solving the above problems. The major objects of the present invention include providing a synthetic polymer film whose surface has a microbicidal activity, and providing a method for preserving food using such a synthetic polymer film, a food film, a food container, and a method for handling food.

Solution to Problem

A food preserving method of an embodiment of the present invention is a method for preserving food using a food film, the food film having a surface which has a plurality of raised portions, a two-dimensional size of the plurality of raised portions being in a range of more than 20 nm and less than 500 nm when viewed in a direction normal to the food film, the method including bringing the food into direct contact with the surface.

In one embodiment, the food film is in the form of a sheet.

In one embodiment, the food film is in the form of a tube or bag and has the surface inside the tube or bag.

A food preserving method of another embodiment of the present invention is a method for preserving food using a food container, the food container having a surface which has a plurality of raised portions over an inner wall or bottom surface, a two-dimensional size of the plurality of raised portions being in a range of more than 20 nm and less than 500 nm when viewed in a direction normal to the surface, the method including bringing the food into direct contact with the surface.

In one embodiment, the food preserving method includes hermetically preserving the food.

In one embodiment, the food preserving method includes hermetically preserving the food in a wrapping film whose water vapor transmission rate is less than 10 g/(m²·24 h) and whose oxygen permeability is less than 100 ml/(m²·24 h·MPa).

In one embodiment, a static contact angle of the surface with respect to hexadecane is not more than 51°.

In one embodiment, a concentration of a nitrogen element included in the surface is not less than 0.7 at %.

A food film of an embodiment of the present invention has a surface which has a plurality of raised portions, wherein a two-dimensional size of the plurality of raised portions is in a range of more than 20 nm and less than 500 nm when viewed in a direction normal to the food film, and the surface has a microbicidal effect.

In one embodiment, a static contact angle of the surface with respect to hexadecane is not more than 51°.

In one embodiment, a concentration of a nitrogen element included in the surface is not less than 0.7 at %.

A food container of an embodiment of the present invention has a surface which has a plurality of raised portions over an inner wall or bottom surface, wherein a two-dimensional size of the plurality of raised portions is in a range of more than 20 nm and less than 500 nm when viewed in a direction normal to the surface, and the surface has a microbicidal effect.

In one embodiment, a static contact angle of the surface with respect to hexadecane is not more than 51°.

In one embodiment, a concentration of a nitrogen element included in the surface is not less than 0.7 at %.

A food handling method of an embodiment of the present invention includes using the food film as set forth in any of the foregoing paragraphs or the food container as set forth in any of the foregoing paragraphs.

A synthetic polymer film according to an embodiment of the present invention is a synthetic polymer film including a surface which has a plurality of first raised portions, wherein a two-dimensional size of the plurality of first raised portions is in a range of more than 20 nm and less than 500 nm when viewed in a normal direction of the synthetic polymer film; and the surface has a microbicidal effect.

In one embodiment, a static contact angle of the surface with respect to hexadecane is not more than 51°.

In one embodiment, an adjoining distance of the plurality of first raised portions is more than 20 nm and not more than 1000 nm.

In one embodiment, a height of the plurality of first raised portions is not less than 50 nm and less than 500 nm. The height of the plurality of first raised portions may be not more than 150 nm.

In one embodiment, the synthetic polymer film further includes a plurality of second raised portions superimposedly formed over the plurality of first raised portions, wherein a two-dimensional size of the plurality of second raised portions is smaller than the two-dimensional size of the plurality of first raised portions and does not exceed 100 nm.

In one embodiment, the plurality of second raised portions include a generally conical portion.

In one embodiment, a height of the plurality of second raised portions is more than 20 nm and not more than 100 nm.

In one embodiment, the synthetic polymer film further includes a lubricant. The lubricant is a fluoric lubricant or silicone lubricant. The HLB (Hydrophile-Lipophile Balance) value of the lubricant is preferably less than 7, and more preferably less than 4.

In one embodiment, the surface of the synthetic polymer film is treated with a mold releasing agent. The mold releasing agent is a fluoric mold releasing agent or silicone mold releasing agent.

A method for sterilizing a gas or liquid according to an embodiment of the present invention includes bringing the gas or liquid into contact with the surface of any of the above-described synthetic polymer films.

A mold according to an embodiment of the present invention includes a surface, the surface having a plurality of first recessed portions and a plurality of second recessed portions formed in the plurality of first recessed portions, wherein a two-dimensional size of the plurality of first recessed portions is in a range of more than 20 nm and less than 500 nm when viewed in a normal direction of the surface of the mold, and a two-dimensional size of the plurality of second recessed portions is smaller than the two-dimensional size of the plurality of first recessed portions and does not exceed 100 nm.

A mold manufacturing method according to an embodiment of the present invention is a method for manufacturing the above-described mold, including: (a) a step of providing an aluminum base or an aluminum film deposited on a support; (b) an anodization step of applying a voltage at a first level while a surface of the aluminum base or the aluminum film is kept in contact with an electrolytic solution, thereby forming a porous alumina layer which has first recessed portions; (c) after step (b), an etching step of bringing the porous alumina layer into contact with an etching solution, thereby enlarging the first recessed portions; and (d) after step (c), applying a voltage at a second level which is lower than the first level while the porous alumina layer is kept in contact with an electrolytic solution, thereby forming second recessed portions in the first recessed portions.

In one embodiment, the first level is higher than 40 V, and the second level is equal to or lower than 20 V.

In one embodiment, the electrolytic solution is an oxalic acid aqueous solution.

Advantageous Effects of Invention

According to an embodiment of the present invention, a synthetic polymer film whose surface has a microbicidal activity, and a method for preserving food using such a synthetic polymer film, a food film, a food container, and a method for handling food are provided.

DESCRIPTION OF EMBODIMENTS

Hereinafter, a synthetic polymer film whose surface has a microbicidal effect, a sterilization method with the use of the surface of the synthetic polymer film, a mold for production of the synthetic polymer film, and a mold manufacturing method according to embodiments of the present invention are described with reference to the drawings. Also, a method for preserving food using such a synthetic polymer film, a food film, a food container, and a method for handling food are described.

In this specification, the following terms are used.

"Sterilization" (or "microbicidal") means reducing the number of proliferative microorganisms contained in an object, such as solid or liquid, or a limited space, by an effective number.

"Microorganism" includes viruses, bacteria, and fungi.

"Antimicrobial" generally includes suppressing and preventing multiplication of microorganisms and includes suppressing dinginess and slime which are attributed to microorganisms.

The present applicant conceived a method for producing an antireflection film which has a moth-eye structure (antireflection surface) with the use of an anodized porous alumina layer. Using the anodized porous alumina layer enables manufacture of a mold which has an inverted moth-eye structure with high mass-productivity (e.g., Patent Documents 1 to 4). The entire disclosures of Patent Documents 1 to 4 are incorporated by reference in this specification. Note that antireflection films which are placed over the surface of liquid crystal television displays manufactured and sold until now by the present applicant are hydrophilic. This is for the purpose of facilitating wiping away of grease, such as fingerprint, adhered to the moth-eye structure. If the moth-eye structure is not hydrophilic, an aqueous washing solution cannot effectively enter the gap between raised portions of the moth-eye structure so that the grease cannot be wiped away.

The present inventors developed the above-described technology and arrived at the concept of a synthetic polymer film whose surface has a microbicidal effect.

The configuration of a synthetic polymer film according to an embodiment of the present invention is described with reference to FIGS. 1(a) and 1(b).

Figure 1:
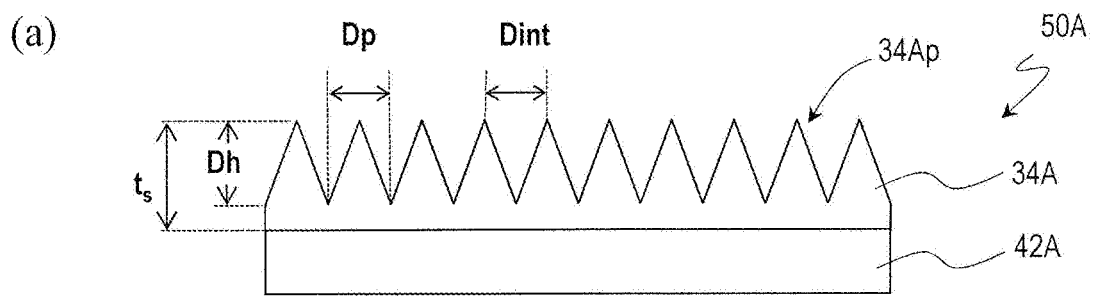
FIGS. 1(a) and (b) are schematic cross-sectional views of synthetic polymer films 34A and 34B, respectively, according to embodiments of the present invention.
Figure 1:
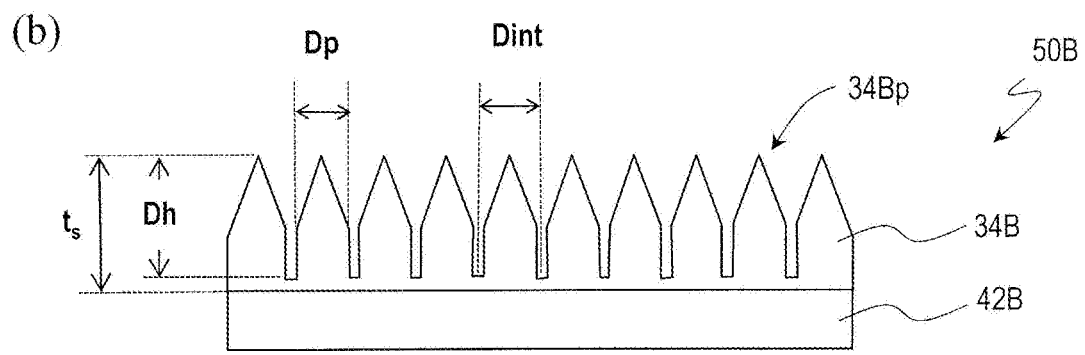

FIGS. 1(a) and 1(b) respectively show schematic cross-sectional views of synthetic polymer films 34A and 34B according to embodiments of the present invention. The synthetic polymer films 34A and 34B described herein as examples are formed on base films 42A and 42B, respectively, although the present invention is not limited to these examples. The synthetic polymer films 34A and 34B can be directly formed on a surface of an arbitrary object.

A film 50A shown in FIG. 1(a) includes a base film 42A and a synthetic polymer film 34A provided on the base film 42A. The synthetic polymer film 34A has a plurality of raised portions 34Ap over its surface. The plurality of raised portions 34Ap constitute a moth-eye structure. When viewed in a normal direction of the synthetic polymer film 34A, the two-dimensional size of the raised portions 34Ap, Dp, is in the range of more than 20 nm and less than 500 nm. Here, the "two-dimensional size" of the raised portions 34Ap refers to the diameter of a circle equivalent to the area of the raised portions 34Ap when viewed in a normal direction of the surface. When the raised portions 34Ap have a conical shape, for example, the two-dimensional size of the raised portions 34Ap is equivalent to the diameter of the base of the cone. The typical adjoining distance of the raised portions 34Ap, Dint, is more than 20 nm and not more than 1000 nm. When the raised portions 34Ap are densely arranged so that there is no gap between adjoining raised portions 34Ap (e.g., the bases of the cones partially overlap each other) as shown in FIG. 1(a), the two-dimensional size of the raised portions 34Ap, Dp, is equal to the adjoining distance Dint. The typical height of the raised portions 34Ap, Dh, is not less than 50 nm and less than 500 nm. As will be described later with experimental examples, a microbicidal activity is exhibited even when the height Dh of the raised portions 34Ap is not more than 150 nm. The thickness of the synthetic polymer film 34A, $t_s$, is not particularly limited but only needs to be greater than the height Dh of the raised portions 34Ap.

The surface of the synthetic polymer film 34A has a microbicidal ability. As will be described later with reference to FIGS. 5(a) to 5(d), the raised portions 34Ap break, for example, the cell walls and/or cell membranes of *P. aeruginosa* that is one of the Gram-negative bacteria, thereby killing *P. aeruginosa* bacteria.

The synthetic polymer film 34A shown in FIG. 1(a) has the same moth-eye structure as the antireflection films disclosed in Patent Documents 1 to 4. From the viewpoint of producing an antireflection function, it is preferred that the surface has no flat portion, and the raised portions 34Ap are densely arranged over the surface. Further, the raised portions 34Ap preferably has a such shape that the cross-sectional area (a cross section parallel to a plane which is orthogonal to an incoming light ray, e.g., a cross section parallel to the surface of the base film 42A) increases from the air side to the base film 42A side, e.g., a conical shape. From the viewpoint of suppressing interference of light, it is preferred that the raised portions 34Ap are arranged without regularity, preferably randomly. However, these features are unnecessary when only the microbicidal activity of the synthetic polymer film 34A is pursued. For example, the raised portions 34Ap do not need to be densely arranged. The raised portions 34Ap may be regularly arranged. Note that, however, the shape and arrangement of the raised portions 34Ap are preferably selected such that the raised portions 34Ap effectively act on microorganisms.

A film 50B shown in FIG. 1(b) includes a base film 42B and a synthetic polymer film 34B provided on the base film 42B. The synthetic polymer film 34B has a plurality of raised portions 34Bp over its surface. The plurality of raised portions 34Bp constitute a moth-eye structure. In the film 50B, the configuration of the raised portions 34Bp of the synthetic polymer film 34B is different from that of the raised portions 34Ap of the synthetic polymer film 34A of the film 50A. Descriptions of features which are common with those of the film 50A are sometimes omitted.

When viewed in a normal direction of the synthetic polymer film 34B, the two-dimensional size of the raised portions 34Bp, Dp, is in the range of more than 20 nm and less than 500 nm. The typical adjoining distance of the raised portions 34Bp, Dint, is more than 20 nm and not more than 1000 nm, and Dp<Dint holds. That is, in the synthetic polymer film 34B, there is a flat portion between adjoining raised portions 34Bp. The raised portions 34Bp have the shape of a cylinder with a conical portion on the air side. The typical height of the raised portions 34Bp, Dh, is not less than 50 nm and less than 500 nm. The raised portions 34Bp may be arranged regularly or may be arranged irregularly. When the raised portions 34Bp are arranged regularly, Dint also represents the period of the arrangement. This also applies to the synthetic polymer film 34A, as a matter of course.

In this specification, the "moth-eye structure" includes not only surficial nanostructures that have an excellent antireflection function and that are formed by raised portions which have such a shape that the cross-sectional area (a cross section parallel to the film surface) increases as do the raised portions 34Ap of the synthetic polymer film 34A shown in FIG. 1(a) but also surficial nanostructures that are formed by raised portions which have a part where the cross-sectional area (a cross section parallel to the film surface) is constant as do the raised portions 34Bp of the synthetic polymer film 34B shown in FIG. 1(b). Note that, from the viewpoint of breaking the cell walls and/or cell membranes of microorganisms, providing a conical portion is preferred. Note that, however, the tip end of the conical shape does not necessarily need to be a surficial nanostructure but may have a rounded portion (about 60 nm) which is generally equal to the nanopillars which form surficial nanostructures of the wings of cicadas.

The surfaces of the synthetic polymer films 34A and 34B may be treated when necessary. For example, a mold releasing agent or surface treatment agent may be applied to the surfaces in order to modify the surface tension (or surface free energy). Some types of the mold releasing agent or surface treatment agent lead to formation of a thin polymer film over the surfaces of the synthetic polymer films 34A and 34B. Alternatively, the surfaces of the synthetic polymer films 34A and 34B may be modified using plasma or the like. For example, by a plasma treatment using a gas which contains fluorine, lipophilicity can be given to the surfaces of the synthetic polymer films 34A and 34B. When the surfaces of the synthetic polymer films 34A and 34B have lipophilicity, the surfaces can have a relatively strong microbicidal activity.

The surface tension (or surface free energy) of the synthetic polymer films 34A and 34B can be modified not only by selecting a resin material itself which forms the synthetic polymer films 34A and 34B but also by adding a material which has a small HLB (Hydrophile-Lipophile Balance) value to a resin material. Further, both of these solutions may be used in combination. The HLB values of materials which are commonly commercially-available as lubricants are small. Particularly, a fluoric lubricant or silicone lubricant is preferably used. By adding a relatively small amount of the fluoric lubricant or silicone lubricant, a desired surface tension can be achieved. The HLB value of the lubricant is preferably less than 7, and more preferably less than 4. Some of the commercially-available lubricants (surfactants) have stated HLB values. The HLB value can be determined by the Davies' method or Kawakami method. The surface tension may be modified by adding the above-described mold releasing agent or surface treatment agent in combination with selection of a resin material which forms the synthetic polymer films 34A and 34B and addition of a lubricant, or solely by adding the above-described mold releasing agent or surface treatment agent.

As will be described later with experimental examples, the contact angle of the surface of the synthetic polymer film with respect to hexadecane is preferably not more than 51°. From the viewpoint of obtaining a synthetic polymer film which has such a surface, the synthetic polymer film preferably contains a fluoric compound. Example methods for obtaining a synthetic polymer film which contains a fluoric compound are described in the following paragraphs. In the examples described herein, a synthetic polymer film is formed using a UV-curable resin (e.g., an acrylic resin (including a methacrylic resin)). However, the same methods can also be utilized when any other photocurable or thermosetting resin is used.

FIRST METHOD: A fluorine-containing acrylic resin is obtained using a fluorine-containing monomer as an acrylic monomer (acrylate) which is a source material of an acrylic resin that forms the synthetic polymer film. The fluorine-containing acrylic resin may be formed by curing a fluorine-containing monomer (i.e., a monomer which contains fluorine in the molecule) or may be formed by curing a mixture of a fluorine-containing monomer and a monomer which does not contain fluorine in the molecule. Note that, in this specification, the monomer is merely a typical example of the source material of the photocurable resin, and it is not intended to exclude oligomers.

SECOND METHOD: A fluoric lubricant is added to the monomer that forms the synthetic polymer film. Here, the fluoric lubricant refers to a compound which would not react with the monomer, i.e., which does not directly or indirectly form a bond (covalent bond) to the skeleton of the resin and includes various fluoric lubricants which are commercially available as fluoric surfactants, fluoric lubricants, fluoric antifoaming agents, fluoric slipping agents, fluoric leveling agents, fluoric mold releasing agents, etc. These fluoric compounds typically have a structure in which hydrogen atoms in alkyl chains are replaced by fluorine atoms. The HLB value of the fluoric lubricant is preferably less than 7, and more preferably less than 4. The HLB value of a fluoric lubricant used in experimental examples which will be described later is less than 4.

THIRD METHOD: When employing a configuration which has an adhesive layer between the base film and the synthetic polymer film, a compound contained in the adhesive layer diffuses throughout the synthetic polymer film, and this phenomenon can be utilized. Such a phenomenon is disclosed in WO 2011/148721 of the present applicant. The entire disclosures of WO 2011/148721 are incorporated by reference in this specification. By adding the above-described fluoric lubricant to the adhesive layer, the same effects as those of the second method can be achieved.

The amount of the fluoric lubricant contained in the synthetic polymer film is preferably not less than 0.1 mass % and not more than 10 mass %, and more preferably not less than 0.5 mass % and not more than 5 mass %, with respect to the entire synthetic polymer film. If the amount of the fluoric lubricant is small, a sufficient effect is not achieved in some cases. If the amount of the fluoric lubricant is excessively large, sometimes it will produce a smear on the surface.

A mold for forming the moth-eye structure such as illustrated in FIGS. 1(a) and 1(b) over the surface (hereinafter, referred to as "moth-eye mold") has an inverted moth-eye structure obtained by inverting the moth-eye structure. Using an anodized porous alumina layer which has the inverted moth-eye structure as a mold without any modification enables inexpensive production of the moth-eye structure. Particularly when a moth-eye mold in the shape of a hollow cylinder is used, the moth-eye structure can be efficiently manufactured according to a roll-to-roll method. Such a moth-eye mold can be manufactured according to methods disclosed in Patent Documents 2 to 4.

A manufacturing method of a moth-eye mold 100A that is for production of the synthetic polymer film 34A is described with reference to FIGS. 2A(a) to 2A(e).

Figure 2A:
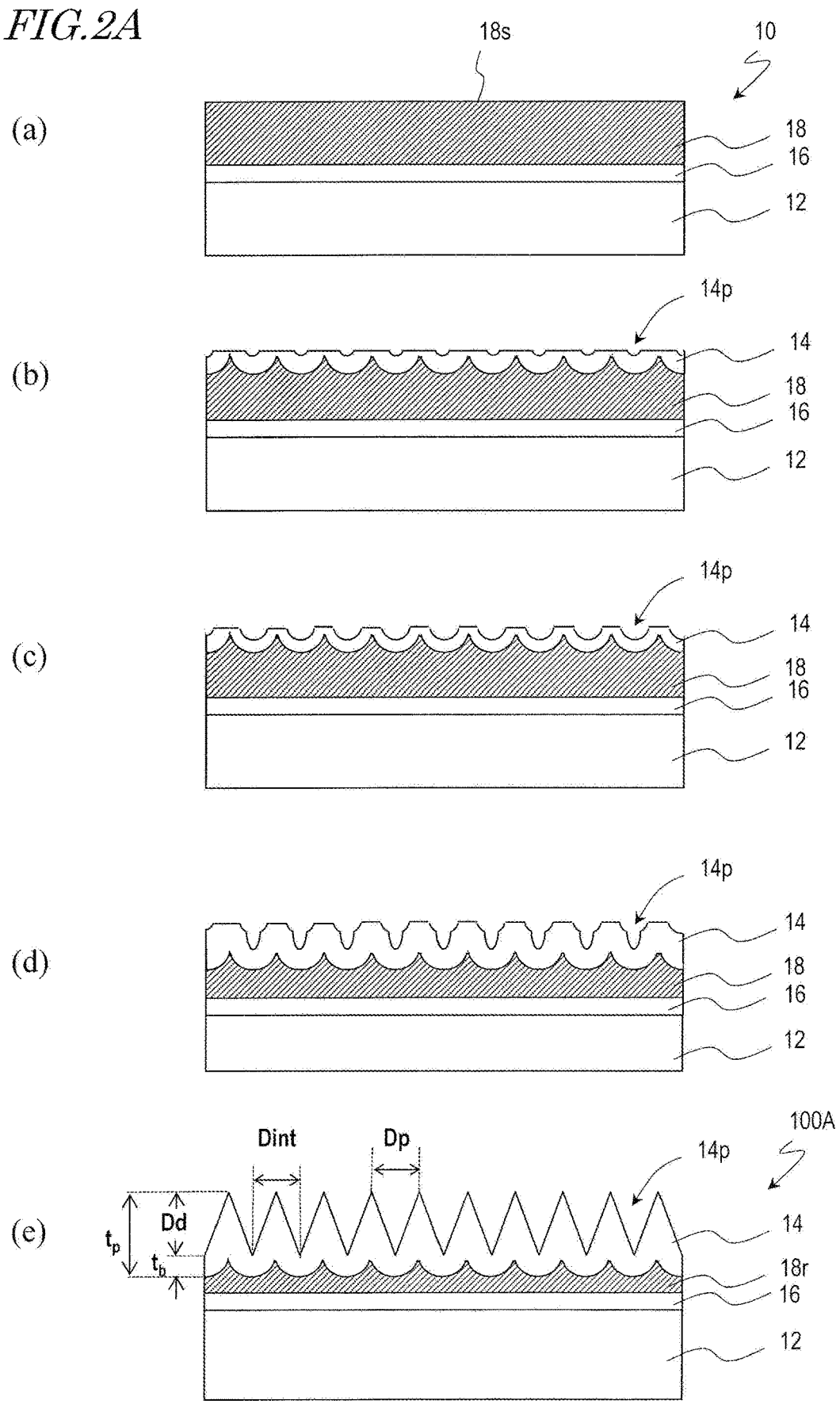
FIG. 2A(a) to (e) are diagrams for illustrating a method for manufacturing a moth-eye mold 100A and a configuration of the moth-eye mold 100A.

Firstly, a mold base 10 is provided which includes an aluminum base 12, an inorganic material layer 16 provided on a surface of the aluminum base 12, and an aluminum film 18 deposited on the inorganic material layer 16 as shown in FIG. 2A(a).

The aluminum base 12 used may be an aluminum base whose aluminum purity is not less than 99.50 mass % and less than 99.99 mass % and which has relatively high rigidity. The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a hollow cylinder is prepared by extrusion, the Mg content is preferably 2.0 mass % or less. If the Mg content exceeds 2.0 mass %, the extrudability deteriorates in general.

The aluminum base 12 used may be an aluminum pipe in the shape of a hollow cylinder which is made of, for example, JIS A1050, an Al—Mg based alloy (e.g., JIS A5052), or an Al—Mg—Si based alloy (e.g., JIS A6063).

The surface of the aluminum base 12 is preferably a surface cut with a bit. If, for example, abrasive particles are remaining on the surface of the aluminum base 12, conduction will readily occur between the aluminum film 18 and the aluminum base 12 in a portion in which the abrasive particles are present. Not only in the portion in which the abrasive particles are remaining but also in a portion which has a roughened surface, conduction readily occurs between the aluminum film 18 and the aluminum base 12. When conduction occurs locally between the aluminum film 18 and the aluminum base 12, there is a probability that a local cell reaction will occur between an impurity in the aluminum base 12 and the aluminum film 18.

The material of the inorganic material layer 16 may be, for example, tantalum oxide ($Ta_2O_5$) or silicon dioxide ($SiO_2$). The inorganic material layer 16 can be formed by, for example, sputtering. When a tantalum oxide layer is used as the inorganic material layer 16, the thickness of the tantalum oxide layer is, for example, 200 nm.

The thickness of the inorganic material layer 16 is preferably not less than 100 nm and less than 500 nm. If the thickness of the inorganic material layer 16 is less than 100 nm, there is a probability that a defect (typically, a void; i.e., a gap between crystal grains) occurs in the aluminum film 18. If the thickness of the inorganic material layer 16 is not less than 500 nm, insulation is likely to occur between the aluminum base 12 and the aluminum film 18 due to the surface condition of the aluminum base 12. To realize anodization of the aluminum film 18 by supplying an electric current from the aluminum base 12 side to the aluminum film 18, the electric current needs to flow between the aluminum base 12 and the aluminum film 18. When employing a configuration where an electric current is supplied from the inside surface of the aluminum base 12 in the shape of a hollow cylinder, it is not necessary to provide an electrode to the aluminum film 18. Therefore, the aluminum film 18 can be anodized across the entire surface, while such a problem does not occur that supply of the electric current becomes more difficult as the anodization advances. Thus, the aluminum film 18 can be anodized uniformly across the entire surface.

To form a thick inorganic material layer 16, it is in general necessary to increase the film formation duration. When the film formation duration is increased, the surface temperature of the aluminum base 12 unnecessarily increases, and as a result, the film quality of the aluminum film 18 deteriorates, and a defect (typically, a void) occurs in some cases. When the thickness of the inorganic material layer 16 is less than 500 nm, occurrence of such a problem can be suppressed.

The aluminum film 18 is, for example, a film which is made of aluminum whose purity is not less than 99.99 mass % (hereinafter, also referred to as "high-purity aluminum film") as disclosed in Patent Document 3. The aluminum film 18 is formed by, for example, vacuum evaporation or sputtering. The thickness of the aluminum film 18 is preferably in the range of not less than about 500 nm and not more than about 1500 nm. For example, the thickness of the aluminum film 18 is about 1 μm.

The aluminum film 18 may be an aluminum alloy film disclosed in Patent Document 4 in substitution for the high-purity aluminum film. The aluminum alloy film disclosed in Patent Document 4 contains aluminum, a metal element other than aluminum, and nitrogen. In this specification, the "aluminum film" includes not only the high-purity aluminum film but also the aluminum alloy film disclosed in Patent Document 4.

Using the above-described aluminum alloy film enables to obtain a specular surface whose reflectance is not less than 80%. The average grain diameter of crystal grains that form the aluminum alloy film when viewed in the normal direction of the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %. It is preferred that the absolute value of the difference between the standard electrode potential of the metal element other than aluminum which is contained in the aluminum alloy film and the standard electrode potential of aluminum is not more than 0.64 V, and that the content of the metal element in the aluminum alloy film is not less than 1.0 mass % and not more than 1.9 mass %. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may contain two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 μm.

Then, a surface 18s of the aluminum film 18 is anodized to form a porous alumina layer 14 which has a plurality of recessed portions (micropores) 14p as shown in FIG. 2A(b). The porous alumina layer 14 includes a porous layer which has the recessed portions 14p and a barrier layer (the base of the recessed portions (micropores) 14p). As known in the art, the interval between adjacent recessed portions 14p (the distance between the centers) is approximately twice the thickness of the barrier layer and is approximately proportional to the voltage that is applied during the anodization. This relationship also applies to the final porous alumina layer 14 shown in FIG. 2A(e).

The porous alumina layer 14 is formed by, for example, anodizing the surface 18s in an acidic electrolytic solution. The electrolytic solution used in the step of forming the porous alumina layer 14 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum film 18 is anodized with an applied voltage of 80 V for 55 seconds using an oxalic acid aqueous solution (concentration: 0.3 mass %, solution temperature: 10° C.), whereby the porous alumina layer 14 is formed.

Then, the porous alumina layer 14 is brought into contact with an alumina etchant such that a predetermined amount is etched away, whereby the opening of the recessed portions 14p is enlarged as shown in FIG. 2A(c). By modifying the type and concentration of the etching solution and the etching duration, the etching amount (i.e., the size and depth of the recessed portions 14p) can be controlled. The etching solution used may be, for example, an aqueous solution of 10 mass % phosphoric acid, organic acid such as formic acid, acetic acid or citric acid, or sulfuric acid, or a chromate-phosphate mixture aqueous solution. For example, the etching is performed for 20 minutes using a phosphoric acid aqueous solution (10 mass %, 30° C.).

Then, the aluminum film 18 is again partially anodized such that the recessed portions 14p are grown in the depth direction and the thickness of the porous alumina layer 14 is increased as shown in FIG. 2A(d). Here, the growth of the recessed portions 14p starts at the bottoms of the previously-formed recessed portions 14p, and accordingly, the lateral surfaces of the recessed portions 14p have stepped shapes.

Thereafter, when necessary, the porous alumina layer 14 may be brought into contact with an alumina etchant to be further etched such that the pore diameter of the recessed portions 14p is further increased. The etching solution used in this step may preferably be the above-described etching solution. Practically, the same etching bath may be used.

In this way, by alternately repeating the anodization step and the etching step as described above through multiple cycles (e.g., 5 cycles: including 5 anodization cycles and 4 etching cycles), the moth-eye mold 100A that includes the porous alumina layer 14 which has the inverted moth-eye structure is obtained as shown in FIG. 2A(e). Since the process is ended with the anodization step, the recessed portions 14p have pointed bottom portion. That is, the resultant mold enables formation of raised portions with pointed tip ends.

The porous alumina layer 14 (thickness: $t_p$) shown in FIG. 2A(e) includes a porous layer (whose thickness is equivalent to the depth Dd of the recessed portions 14p) and a barrier layer (thickness: $t_b$). Since the porous alumina layer 14 has a structure obtained by inverting the moth-eye structure of the synthetic polymer film 34A, corresponding parameters which define the dimensions may sometimes be designated by the same symbols.

The recessed portions 14p of the porous alumina layer 14 may have, for example, a conical shape and may have a stepped lateral surface. It is preferred that the two-dimensional size of the recessed portions 14p (the diameter of a circle equivalent to the area of the recessed portions 14p when viewed in a normal direction of the surface), Dp, is more than 20 nm and less than 500 nm, and the depth of the recessed portions 14p, Dd, is not less than 50 nm and less than 1000 nm (1 μm). It is also preferred that the bottom portion of the recessed portions 14p is acute (with the deepest part of the bottom portion being pointed). When the recessed portions 14p are in a densely packed arrangement, assuming that the shape of the recessed portions 14p when viewed in a normal direction of the porous alumina layer 14 is a circle, adjacent circles overlap each other, and a saddle portion is formed between adjacent ones of the recessed portions 14p. Note that, when the generally-conical recessed portions 14p adjoin one another so as to form saddle portions, the two-dimensional size of the recessed portions 14p, Dp, is equal to the adjoining distance Dint. The thickness of the porous alumina layer 14, $t_p$, is for example not more than about 1 μm.

Under the porous alumina layer 14 shown in FIG. 2A(e), there is an aluminum remnant layer 18r. The aluminum remnant layer 18r is part of the aluminum film 18 which has not been anodized. When necessary, the aluminum film 18 may be substantially thoroughly anodized such that the aluminum remnant layer 18r is not present. For example, when the inorganic material layer 16 has a small thickness, it is possible to readily supply an electric current from the aluminum base 12 side.

The manufacturing method of the moth-eye mold illustrated herein enables manufacture of a mold which is for production of antireflection films disclosed in Patent Documents 2 to 4. Since an antireflection film used in a high-definition display panel is required to have high uniformity, selection of the material of the aluminum base, specular working of the aluminum base, and control of the purity and components of the aluminum film are preferably carried out as described above. However, the above-described mold manufacturing method can be simplified because the microbicidal activity can be achieved without high uniformity. For example, the surface of the aluminum base may be directly anodized. Even if, in this case, pits are formed due to impurities contained in the aluminum base, only local structural irregularities occur in the moth-eye structure of the finally-obtained synthetic polymer film 34A, and it is estimated that there is little adverse influence on the microbicidal activity.

According to the above-described mold manufacturing method, a mold in which the regularity of the arrangement of the recessed portions is low, and which is suitable to production of an antireflection film, can be manufactured. In the case of utilizing the microbicidal ability of the moth-eye structure, it is estimated that the regularity of the arrangement of the raised portions does not exert an influence. A mold for formation of a moth-eye structure which has regularly-arranged raised portions can be manufactured, for example, as described in the following section.

For example, after formation of a porous alumina layer having a thickness of about 10 μm, the formed porous alumina layer is removed by etching, and then, anodization may be performed under the conditions for formation of the above-described porous alumina layer. A 10 μm thick porous alumina layer is realized by extending the anodization duration. When such a relatively thick porous alumina layer is formed and then this porous alumina layer is removed, a porous alumina layer having regularly-arranged recessed portions can be formed without being influenced by irregularities which are attributed to grains that are present at the surface of an aluminum film or aluminum base or the process strain. Note that, in removal of the porous alumina layer, using a mixture solution of a chromate and a phosphate is preferred. Although continuing the etching for a long period of time sometimes causes galvanic corrosion, the mixture solution of a chromate and a phosphate has the effect of suppressing galvanic corrosion.

A moth-eye mold for production of the synthetic polymer film 34B shown in FIG. 1(b) can be, basically, manufactured by combination of the above-described anodization step and etching step. A manufacturing method of a moth-eye mold 100B that is for production of the synthetic polymer film 34B is described with reference to FIGS. 2B(a) to 2B(c).

Firstly, in the same way as illustrated with reference to FIGS. 2A(a) and 2A(b), the mold base 10 is provided, and the surface 18s of the aluminum film 18 is anodized, whereby a porous alumina layer 14 which has a plurality of recessed portions (micropores) 14p is formed.

Figure 2B:
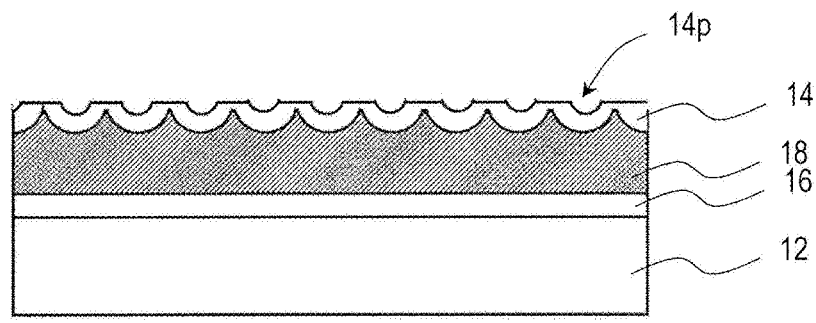
FIG. 2B(a) to (c) are diagrams for illustrating a method for manufacturing a moth-eye mold 100B and a configuration of the moth-eye mold 100B.
Figure 2B:
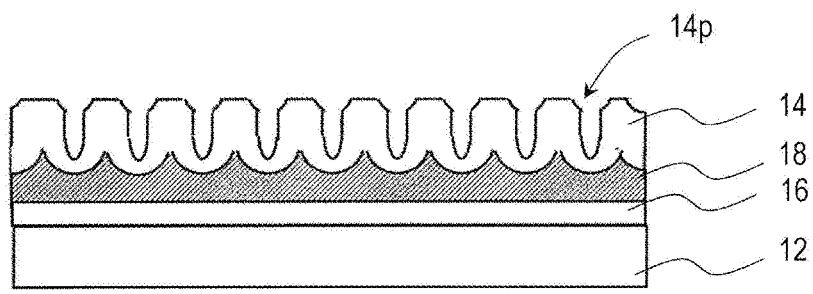
Figure 2B:
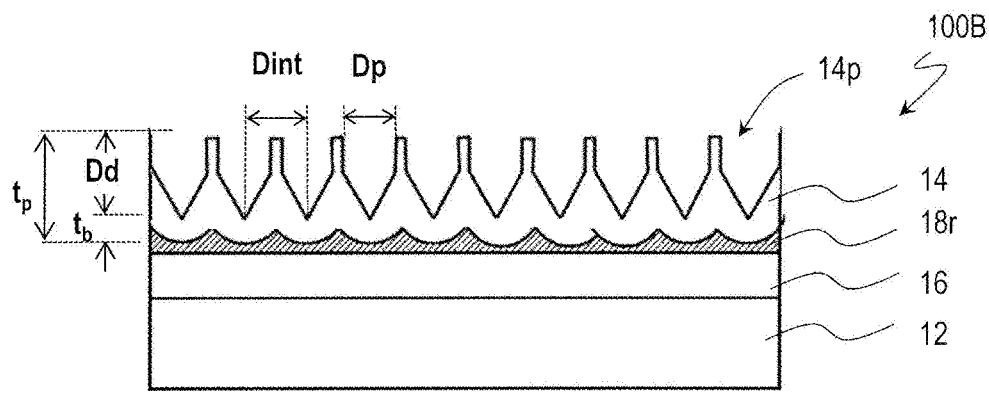

Then, the porous alumina layer 14 is brought into contact with an alumina etchant such that a predetermined amount is etched away, whereby the opening of the recessed portions 14p is enlarged as shown in FIG. 2B(a). In this step, the etched amount is smaller than in the etching step illustrated with reference to FIG. 2A(c). That is, the size of the opening of the recessed portions 14p is decreased. For example, the etching is performed for 10 minutes using a phosphoric acid aqueous solution (10 mass %, 30° C.).

Then, the aluminum film 18 is again partially anodized such that the recessed portions 14p are grown in the depth direction and the thickness of the porous alumina layer 14 is increased as shown in FIG. 2B(b). In this step, the recessed portions 14p are grown deeper than in the anodization step illustrated with reference to FIG. 2A(d). For example, the anodization is carried out with an applied voltage of 80 V for 165 seconds (in FIG. 2A(d), 55 seconds) using an oxalic acid aqueous solution (concentration: 0.3 mass %, solution temperature: 10° C.).

Thereafter, the etching step and the anodization step are alternately repeated through multiple cycles in the same way as illustrated with reference to FIG. 2A(e). For example, 3 cycles of the etching step and 3 cycles of the anodization step are alternately repeated, whereby the moth-eye mold 100B including the porous alumina layer 14 which has the inverted moth-eye structure is obtained as shown in FIG. 2B(c). In this step, the two-dimensional size of the recessed portions 14p, Dp, is smaller than the adjoining distance Dint (Dp<Dint).

Figure 3:
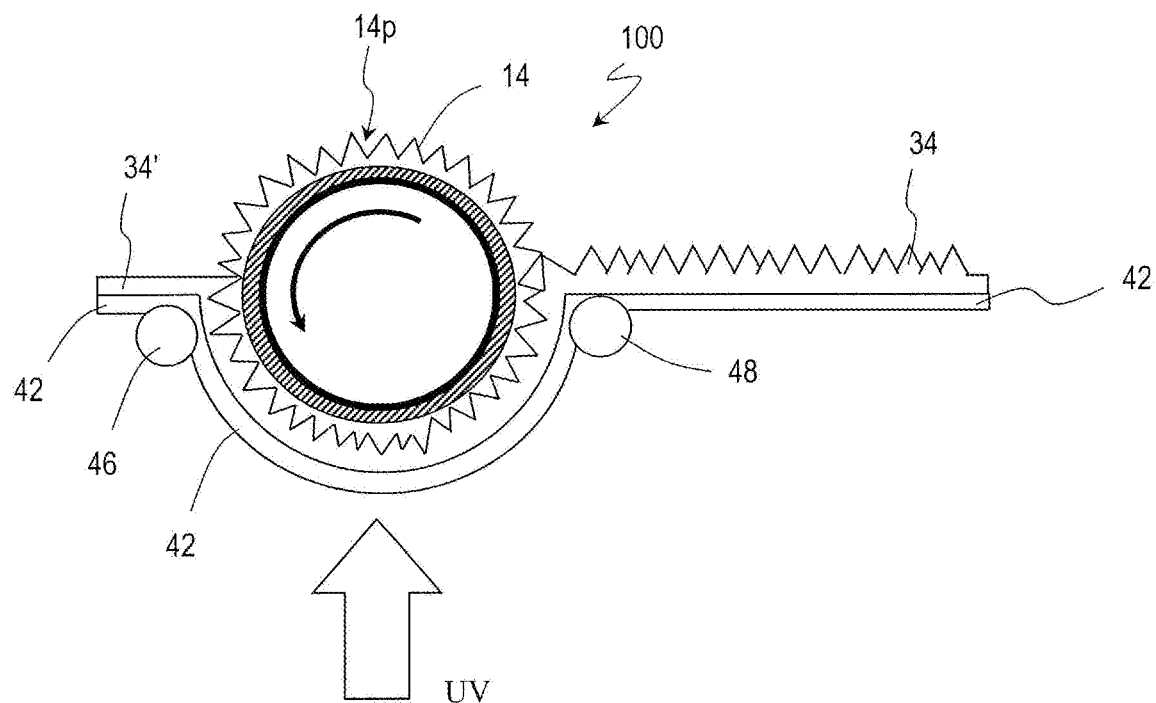
FIG. 3 A diagram for illustrating a method for producing a synthetic polymer film with the use of the moth-eye mold 100.

Next, a method for producing a synthetic polymer film with the use of a moth-eye mold 100 is described with reference to FIG. 3. FIG. 3 is a schematic cross-sectional view for illustrating a method for producing a synthetic polymer film according to a roll-to-roll method.

First, a moth-eye mold 100 in the shape of a hollow cylinder is provided. Note that the moth-eye mold 100 in the shape of a hollow cylinder is manufactured according to, for example, the manufacturing method described with reference to FIG. 2A.

As shown in FIG. 3, a base film 42 over which a UV-curable resin 34' is applied on its surface is maintained pressed against the moth-eye mold 100, and the UV-curable resin 34' is irradiated with ultraviolet (UV) light such that the UV-curable resin 34' is cured. The UV-curable resin 34' used may be, for example, an acrylic resin. The base film 42 may be, for example, a PET (polyethylene terephthalate) film or TAC (triacetyl cellulose) film. The base film 42 is fed from an unshown feeder roller, and thereafter, the UV-curable resin 34' is applied over the surface of the base film 42 using, for example, a slit coater or the like. The base film 42 is supported by supporting rollers 46 and 48 as shown in FIG. 3. The supporting rollers 46 and 48 have rotation mechanisms for carrying the base film 42. The moth-eye mold 100 in the shape of a hollow cylinder is rotated at a rotation speed corresponding to the carrying speed of the base film 42 in a direction indicated by the arrow in FIG. 3.

Thereafter, the moth-eye mold 100 is separated from the base film 42, whereby a synthetic polymer film 34 to which the inverted moth-eye structure of the moth-eye mold 100 is transferred is formed on the surface of the base film 42. The base film 42 which has the synthetic polymer film 34 formed on the surface is wound up by an unshown winding roller.

The surface of the synthetic polymer film 34 has the moth-eye structure obtained by inverting the surficial nanostructures of the moth-eye mold 100. According to the surficial nanostructure of the moth-eye mold 100 used, the synthetic polymer films 34A and 34B shown in FIGS. 1(a) and 1(b), respectively, can be produced. The material that forms the synthetic polymer film 34 is not limited to the UV-curable resin but may be a photocurable resin which is curable by visible light or may be a thermosetting resin.

Hereinafter, it is explained with experimental examples that the synthetic polymer film which has the above-described moth-eye structure over its surface has the microbicidal ability.

A mold manufactured according to the above-described mold manufacturing method was used to produce a synthetic polymer film having conical raised portions such as the raised portions 34Ap of the film 50A shown in FIG. 1(a). In sample films subjected to evaluation of the microbicidal activity, Dp was about 200 nm, Dint was about 200 nm, and Dh was about 150 nm (see FIG. 5, for example). From the viewpoint of causing local deformation of the cell wall, it is preferred that there is a large distance between adjoining raised portions. The difference between Dp and Dint is preferably, for example, 0 times to twice Dp, and more preferably 0.5 times to twice Dp. Here, Dp, Dint, and Dh represent the average values determined from SEM images. In photographing of the SEM images, a field emission scanning electron microscope (S-4700 manufactured by Hitachi, Ltd.) was used.

The resin material used for formation of the synthetic polymer film was a UV-curable resin. Sample film No. 1 and sample film No. 2 were produced using the same fluorine-containing acrylic resin. In sample film No. 2, a mold releasing agent was applied over the surface of the resultant synthetic polymer film, whereby a synthetic polymer film was obtained which had a different surface free energy from the surface of the synthetic polymer film of sample film No. 1. Sample film No. 3 was produced using a urethane acrylate-containing acrylic resin to which a fluorine-containing anionic lubricant F1 was added. The fluorine-containing anionic lubricant F1 used was FUTARGENT 150 (manufactured by NEOS Company Limited) commercially available as a fluoric slipping agent (or fluoric surfactant). The percentage of the added lubricant F1 to the total acrylic resin composition was 2 mass %. Sample film No. 4 was a synthetic polymer film which was produced using a urethane acrylate-containing acrylic resin (to which the above-described lubricant F1 was not added), the synthetic polymer film having a surface to which a mold releasing agent was applied. The mold releasing treatment for the synthetic polymer films of sample films No. 2 and No. 4 was spraying a fluoric mold releasing agent (OPTOOL DSX manufactured by DAIKIN INDUSTRIES, LTD) over the entire surface of the synthetic polymer films and drying the surface at room temperature in air. The mold releasing agent R1 used for sample film No. 2 and the mold releasing agent R2 used for sample film No. 4 were obtained by diluting OPTOOL DSX with perfluorohexane so as to have respective concentrations.

The surface tension of the sample films was evaluated by measuring the contact angle of water and hexadecane at 22° C. with respect to the sample films using a contact angle meter (PCA-1 manufactured by Kyowa Interface Science Co., Ltd). The average value of five measurements of the contact angle is shown in Table 1.

TABLE 1

| No. | SYNTHETIC POLYMER FILM (BASE FILM: PET) | CONTACT ANGLE OF WATER (°) | CONTACT ANGLE OF HEXADECANE (°) | MICROBICIDAL ABILITY |
|---|---|---|---|---|
| 1 | FLUORINE-CONTAINING ACRYLIC RESIN A | 131.2 | 30.7 | ○ |
| 2 | FLUORINE-CONTAINING ACRYLIC RESIN A + MOLD RELEASING AGENT R1 (0.1 mass %) | 126.2 | 50.9 | Δ |
| 3 | URETHANE ACRYLATE-CONTAINING ACRYLIC RESIN B WITH FLUORIC LUBRICANT F1 ADDED | 12.0 | 4.8 | ○ |
| 4 | URETHANE ACRYLATE-CONTAINING ACRYLIC RESIN B + MOLD RELEASING AGENT R2 (0.01 mass %) | 73.3 | 9.4 | ○ |

The microbicidal ability was evaluated through the following procedure:

1. Beads with frozen *P. aeruginosa* bacteria (purchased from National Institute of Technology and Evaluation) were immersed in a broth at 37° C. for 24 hours, whereby the *P. aeruginosa* bacteria were thawed;
2. Centrifugation (3000 rpm, 10 minutes);
3. The supernatant of the broth was removed;
4. Sterilized water was added, and the resultant solution was stirred and thereafter subjected to centrifugation again;
5. Steps 2 to 4 were repeated three times to obtain an undiluted bacterial solution (bacteria count: 1E+08 CFU/mL);
6. 1/500 NB culture medium and bacterial dilution A (bacteria count: 1E+06 CFU/mL) were prepared.

1/500 NB culture medium: NB culture medium (nutrient broth medium E-MC35 manufactured by Eiken Chemical Co., Ltd.) was diluted 500-fold with sterilized water.

Bacterial Dilution A: Undiluted Bacterial Solution 500 μL+Broth 100 μL+Sterilized Water 49.4 mL;

7. Bacterial dilution B was prepared by adding the 1/500 NB culture medium as a nutrient source to bacterial dilution A (in accordance with JIS Z2801 5.4a)) 8. Bacterial dilution B was sprayed twice from a distance of about 10 cm on each of the sample films placed on a black acrylic plate (the amount of one spray: about 150 μL);
9. The sample films sprayed with bacterial dilution B are left in an airtight resin container (37° C., relative humidity 100%) for a predetermined time period;
10. Thereafter, the surfaces of the sample films were stamped with PETAN CHECK™ (product name: PT1025, manufactured by Eiken Chemical Co., Ltd.) such that the bacteria on the sample film surfaces were transferred to the standard agar medium;
11. The bacteria transferred to the standard agar medium were cultured at 37° C. for 24 hours, and thereafter, the presence/absence of colonies was checked.

Figure 4:
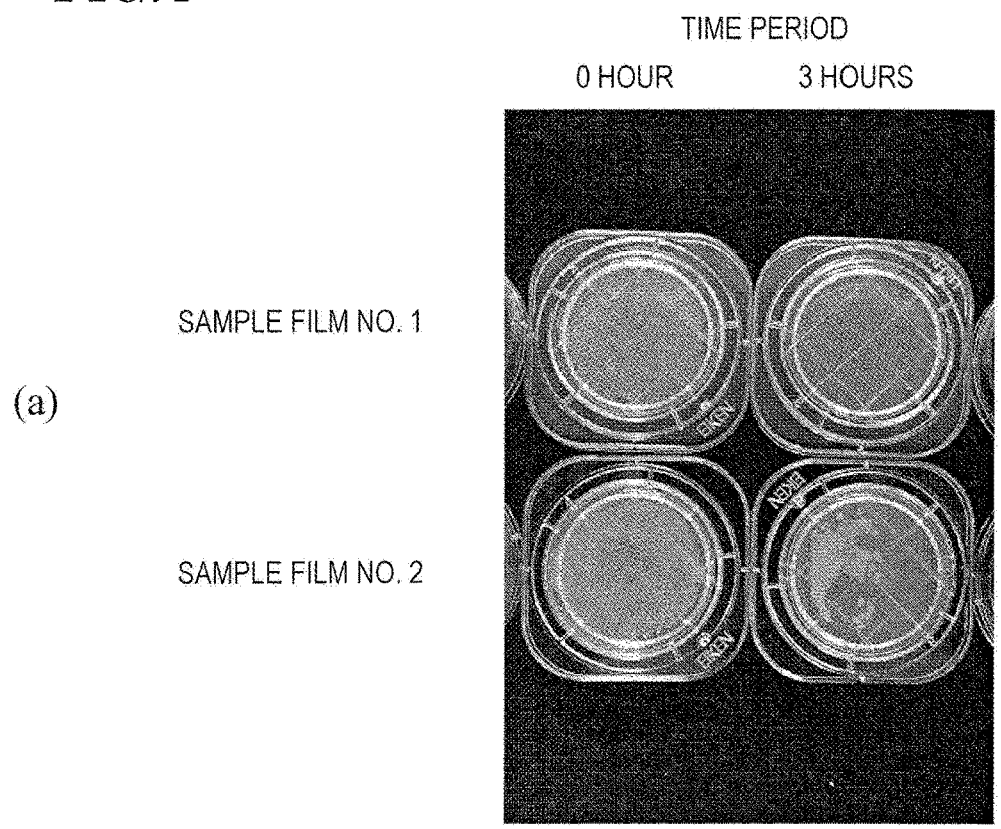
FIGS. 4(a) and (b) are pictures for illustrating the evaluation results of the microbicidal ability of sample films No. 1 to No. 4 and are, specifically, optical images of the surfaces of agar media on which *Pseudomonas aeruginosa* (or "*P. aeruginosa*") bacteria were cultured. The upper part of (a) shows the evaluation results of sample film No. 1 (the time period that the sample film was left: 0 hour (5 minutes), 3 hours). The lower part of (a) shows the evaluation results of sample film No. 2 (the time period: 0 hour (5 minutes), 3 hours). The upper part of (b) shows the evaluation results of sample film No. 3 (the time period: 0 hour (5 minutes), 3 hours). The lower part of (b) shows the evaluation results of sample film No. 4 (the time period: 0 hour (5 minutes), 3 hours).
Figure 4:
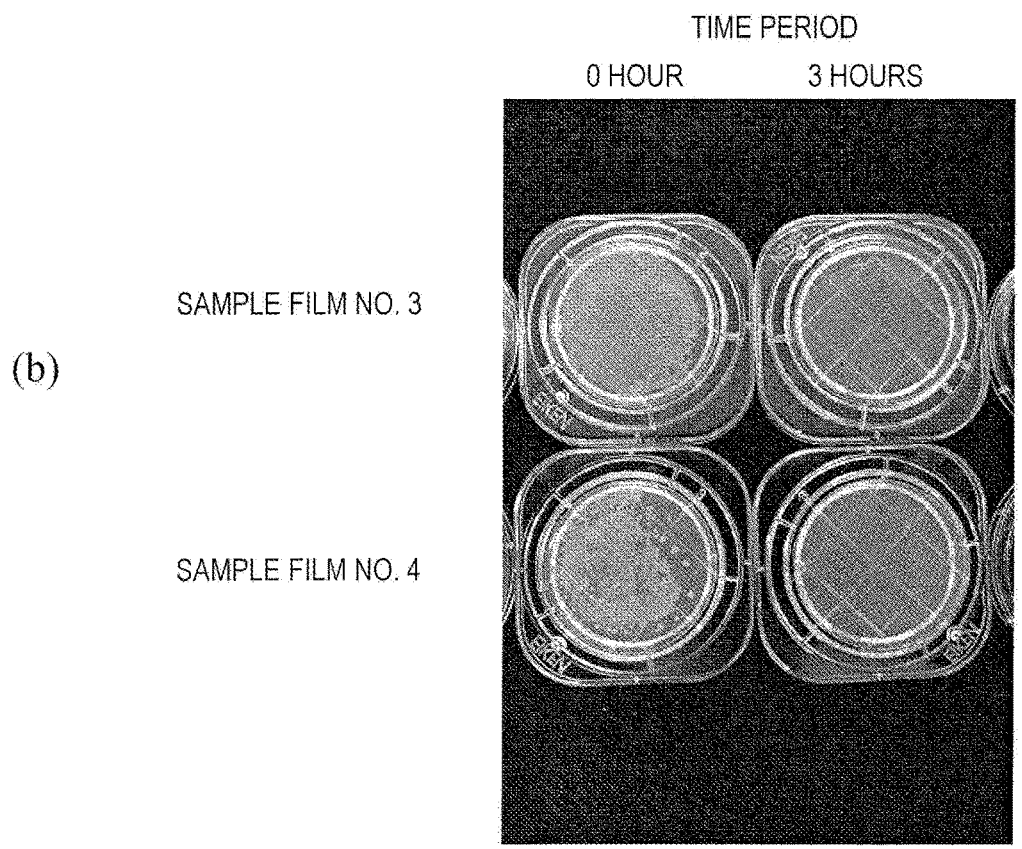
Figure 5:
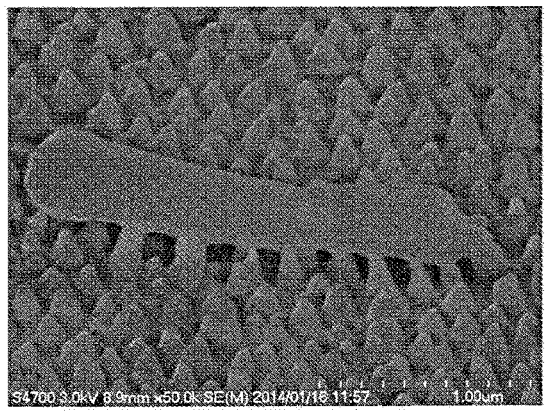
FIG. 5(a) to (d) show SEM images obtained by SEM (Scanning Electron Microscope) observation of a *P. aeruginosa* bacterium which died at a surface which had a moth-eye structure.
Figure 5:
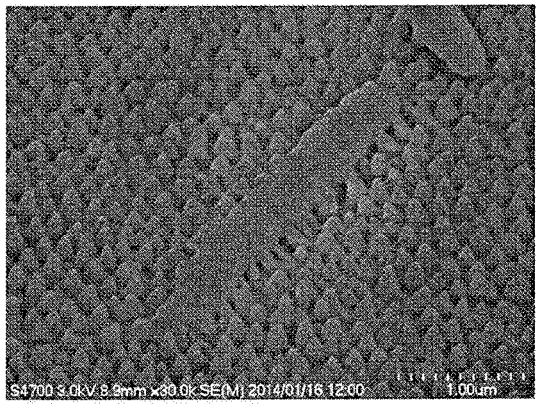
Figure 5:
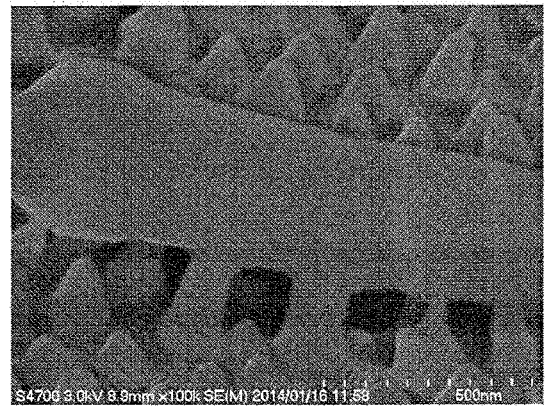
Figure 5:
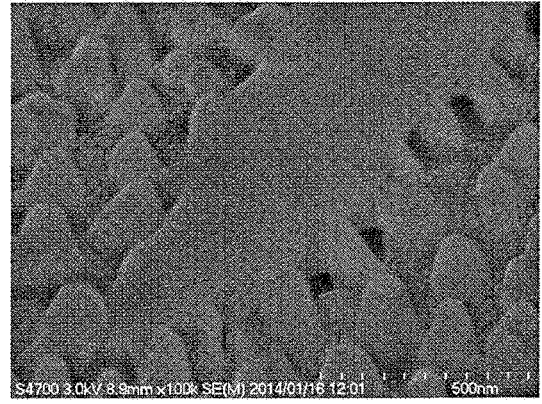

In each of sample films No. 1 to No. 4, films left at Step 9 under the conditions that the time period was 0 hour (5 minutes) or 3 hours were subjected to PETAN CHECK™. The results of culturing at the standard agar medium are shown in FIGS. 4(*a*) and 4(*b*). In FIG. 4(*a*), the upper part shows the evaluation results of sample film No. 1 (the time period: 0 hour (5 minutes), 3 hours), and the lower part shows the evaluation results of sample film No. 2 (the time period: 0 hour (5 minutes), 3 hours). In FIG. 4(b), the upper part shows the evaluation results of sample film No. 3 (the time period: 0 hour (5 minutes), 3 hours), and the lower part shows the evaluation results of sample film No. 4 (the time period: 0 hour (5 minutes), 3 hours).

Refer to FIGS. 4(a) and 4(b). As for sample films No. 1 to No. 4, the samples on the left hand side (the time period was 0 hour (5 minutes)) show that grown bacteria covers the substantially entire surface of the medium, while in the samples on the right hand side of sample films Nos. 1, 3 and 4 (the time period was 3 hours), growth of the bacteria was not detected. In the sample on the right hand side of sample film No. 2 (the time period: 3 hours), growth of the bacteria was detected, but the number of grown bacteria was obviously smaller than in the sample on the left hand side (the time period: 0 hour (5 minutes)).

From the foregoing, it is understood that every one of sample films No. 1 to No. 4 has a microbicidal activity. One of the possible reasons that the microbicidal activity of sample film No. 2 is weaker than that of sample film No. 1 is the difference in surface free energy. As seen from Table 1, the contact angle of sample film No. 2 with respect to hexadecane is 50.9°, which is greater by about 20° than that of sample film No. 1 (30.7°). That is, it is inferred that the microbicidal ability of sample film No. 2 is weaker because the surface of sample film No. 2 has inferior lipophilicity to the surface of sample film No. 1.

FIGS. 5(a) to 5(d) show examples of SEM (Scanning Electron Microscope) observation of *P. aeruginosa* bacteria which died at a surface of sample film No. 1 which had a moth-eye structure. The full scale in the SEM images of FIGS. 5(a) and 5(b) is 1 µm. FIGS. 5(c) and 5(d) are enlarged views of FIGS. 5(a) and 5(b), respectively, in which the full scale in the SEM images is 500 nm.

As seen from these SEM images, the tip end portions of the raised portions enter the cell wall (exine) of a *P. aeruginosa* bacterium. In FIGS. 5(c) and 5(d), the raised portions do not appear to break through the cell wall but appears to be taken into the cell wall. This might be explained by the mechanism suggested in the "Supplemental Information" section of Non-patent Document 1. That is, it is estimated that the exine (lipid bilayer) of the Gram-negative bacteria came close to the raised portions and deformed so that the lipid bilayer locally underwent a transition like a first-order phase transition (spontaneous reorientation) and openings were formed in portions close to the raised portions, and the raised portions entered these openings.

Apart from the validity of the above-described mechanism, it is inferred from the above-described experimental results that when the surface of a synthetic polymer film has appropriate lipophilicity (preferably, the contact angle with respect to hexadecane is not more than 50.9°), the Gram-negative bacteria in the aqueous solution come close to the raised portions of the synthetic polymer film to cause interaction, and as a result, the raised portions enter the exine (lipid bilayer) of the Gram-negative bacteria so that the cell wall is broken. In this case, the force which acts on the exine of the Gram-negative bacteria depends on the free energy of the surface of the exine, the free energy of the surface of the raised portions, and the free energy of water which is in contact with these surfaces. It is estimated that, when the raised portions are lipophilic, the force which acts on the exine is large. As seen from the results of Table 1, the contact angle of the surface of the synthetic polymer film with respect to hexadecane is preferably not more than 51°, and more preferably not more than 31°. It can be said that, as the contact angle decreases, the microbicidal activity increases. Also as seen from the results of Table 1, the contact angle of the surface of the synthetic polymer film with respect to water ranges from 12.0° to 131.2°. It is understood that the hydrophilicity (or, conversely, hydrophobicity) of the surface of the synthetic polymer film which is evaluated by the contact angle of water does not directly relate to the microbicidal activity.

Next, the results of experiments for verifying the microbicidal activity achieved by the moth-eye structure of sample film No. 1 are described with reference to FIGS. 6(a) to 6(f). For comparison with sample film No. 1 that is a synthetic polymer film which has the moth-eye structure, a flat synthetic polymer film without the moth-eye structure which was made of the same resin material as sample film No. 1 (comparative example 1) and a PET film which is on the rear surface of sample film No. 1 (comparative example 2) were evaluated as to the microbicidal ability through the following procedure.

1. A 400 µL drop of the above-described bacterial dilution A (bacteria count: 1E+06 CFU/mL) was placed on each of the sample films. A cover (e.g., cover glass) was placed over the bacterial dilution A to adjust the amount of the bacterial dilution A per unit area.

Meanwhile, a sample without a cover over the bacterial dilution A was also prepared.

2. The samples were left in an environment where the temperature was 37° C. and the relative humidity was 100% for a predetermined time period. Thereafter, the entire sample film with the bacterial dilution A and 10 mL sterilized water were put into a filter bag.

3. The sample films were rubbed with hands over the filter bag to sufficiently wash away the bacteria from the sample films (post-wash solution (sometimes referred to as "bacterial dilution B'"), bacteria count: 1E+04 CFU/mL).

4. 1 mL of the post-wash solution was put into 9 mL phosphate buffer solution, whereby bacterial dilution C (bacteria count: 1E+03 CFU/mL) was prepared.

5. 1 mL of the bacterial dilution C was put into 9 mL phosphate buffer solution, whereby bacterial dilution D (bacteria count: 1E+02 CFU/mL) was prepared. Then, 1 mL of the bacterial dilution D was put into 9 mL phosphate buffer solution, whereby bacterial dilution E (bacteria count: 1E+01 CFU/mL) was prepared.

6. 1 mL drops of the bacterial dilutions C to E were placed on Petrifilm™ media (product name: Aerobic Count Plate (AC), manufactured by 3M). The bacteria were cultured at 37° C. with the relative humidity of 100%. After 48 hours, the number of bacteria in the bacterial dilution B' was counted.

Figure 6:
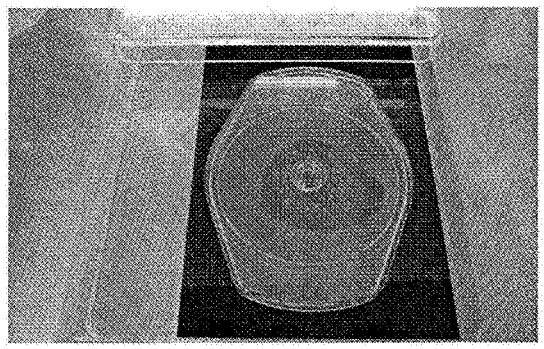
FIG. 6 Pictures for illustrating the results of examinations as to the microbicidal activity achieved by the moth-eye structure. (a) shows the state of sample film No. 1 with a cover. (b) shows the state of comparative example 1 with a cover. (c) shows the state of comparative example 2 with a cover. (d) shows the state of sample film No. 1 without a cover. (e) shows the state of comparative example 1 without a cover. (f) shows the state of comparative example 2 without a cover.
Figure 6:
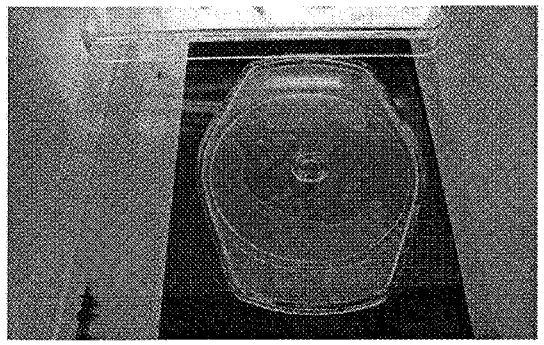
Figure 6:
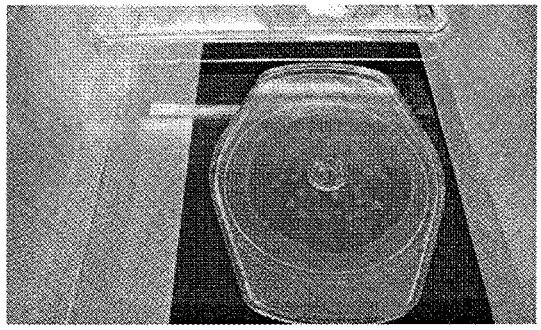
Figure 6:
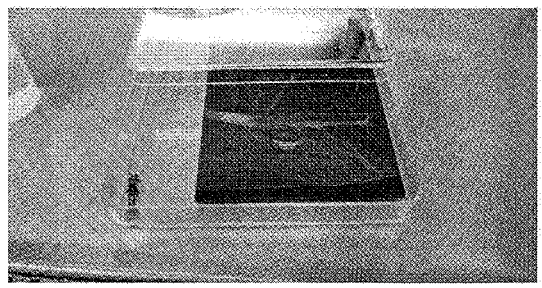
Figure 6:
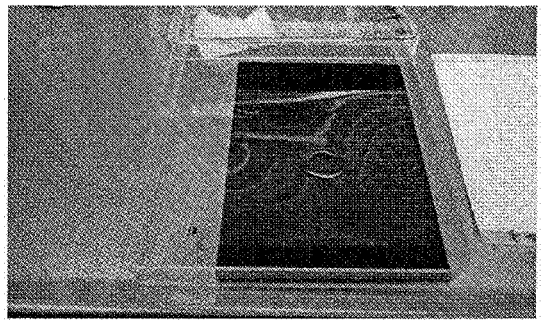
Figure 6:
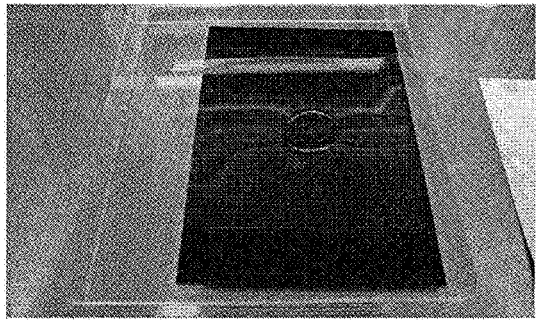

The results are shown in Table 2 below. FIG. 6(a) shows the state of sample film No. 1 with a cover. FIG. 6(b) shows the state of a sample of comparative example 1 with a cover. FIG. 6(c) shows the state of a sample of comparative example 2 with a cover. FIG. 6(d) shows the state of sample film No. 1 without a cover. FIG. 6(e) shows the state of a sample of comparative example 1 without a cover. FIG. 6(f) shows the state of a sample of comparative example 2 without a cover.

TABLE 2

| | SAMPLE FILM NO. 1 | COMPARATIVE EXAMPLE 1 | COMPARATIVE EXAMPLE 2 |
|---|---|---|---|
| WITH COVER | 0 | 7.10E+05 | 1.14E+06 |
| WITHOUT COVER | 2.73E+05 | 2.50E+05 | 8.10E+05 |

As clearly seen from the results of Table 2, only sample film No. 1 produced the microbicidal activity. The microbicidal activity was produced by the moth-eye structure irrespective of the type of the resin material that forms the synthetic polymer film.

Note that sample film No. 1 did not produce the microbicidal activity when the cover was not placed over the bacterial dilution. This is probably because a large number of bacteria were not killed at the surface which had the moth-eye structure, and these bacteria grew.

Next, seven types of sample films No. 5 to No. 11 shown in Table 3 below were evaluated as to the microbicidal ability.

Sample films No. 5 to No. 9 were produced using the same mold as that described above. Synthetic polymer films having different surface free energies were produced by means of using different resin materials for formation of the synthetic polymer films and/or providing a mold release treatment to the surface of the synthetic polymer films.

Sample film No. 5 is a film produced using the fluorine-containing acrylic resin A (which is the same as that used for sample film No. 1) and exhibited generally equal values of the contact angle with respect to water and hexadecane to those of sample film No. 1.

Sample film No. 6 was produced using a resin which was prepared by adding a fluoric lubricant F2 to the acrylic resin B that contains urethane acrylate (which is the same as that used for sample film No. 3 described above). The fluorine-containing nonionic lubricant F2 used was FUTARGENT 250 (manufactured by NEOS Company Limited) commercially available as a fluoric slipping agent (or fluoric surfactant). FUTARGENT has a perfluoroalkenyl structure. The added amount of the fluoric lubricant F2 was 2 mass % with respect to the total resin amount. Further, a surface of the resultant synthetic polymer film was provided with a mold release treatment with the use of the mold releasing agent R1.

Sample film No. 7 was produced using a resin which was prepared by adding the fluoric lubricant F2 (2 mass % with respect to the total resin amount) to the acrylic resin B that contains the same urethane acrylate as that of sample film No. 6. Sample film No. 7 is different from sample film No. 6 in that the mold release treatment was not provided.

Sample film No. 8 was produced using a urethane acrylate-containing acrylic resin C (which is different from the above-described urethane acrylate-containing acrylic resin B).

For sample film No. 9, the fluorine-containing acrylic resin D used was a fluoric coating agent UT-UCH23 manufactured by AGC SEIMI CHEMICAL CO., LTD.

As sample film No. 10, the microbicidal ability of a commercially-available antimicrobial silver ion sheet (material: polypropylene, additive: silver based inorganic antimicrobial agent, product size: about 80×160 mm, 24 sheets contained, purchase price: 108 yen) was evaluated.

Sample film No. 11 was a PET film which was used as the base film of sample films No. 5 to No. 9.

The contact angle of the surfaces of the respective films with respect to water and hexadecane was measured in the same way as that described above.

The procedure of the evaluation of the microbicidal ability was basically the same as that described for Table 2 shown above, except that a bacterial dilution A' in which the concentration of P. aeruginosa bacteria was 1.4E+05 CFU/mL was used instead of the bacterial dilution A. The bacterial dilution A' was dropped onto the respective sample films, and thereafter, a cover was placed thereon. The samples were left in an environment of 37° C. and the relative humidity 100% for 0 hour (5 minutes), 3 hours, 20 hours, or 70 hours and 15 minutes. Thereafter, the bacteria were sufficiently washed away from the sample films. The solution was diluted at a required degree of dilution according to the above-described procedure. The resultant bacterial dilution was dropped onto Petrifilm™ media (product name: Aerobic Count Plate (AC), manufactured by 3M). The bacteria were cultured at 37° C. with the relative humidity of 100%. After 48 hours, the number of bacteria in the bacterial dilution B' was counted. The results are shown in FIG. 8.

Figure 8:
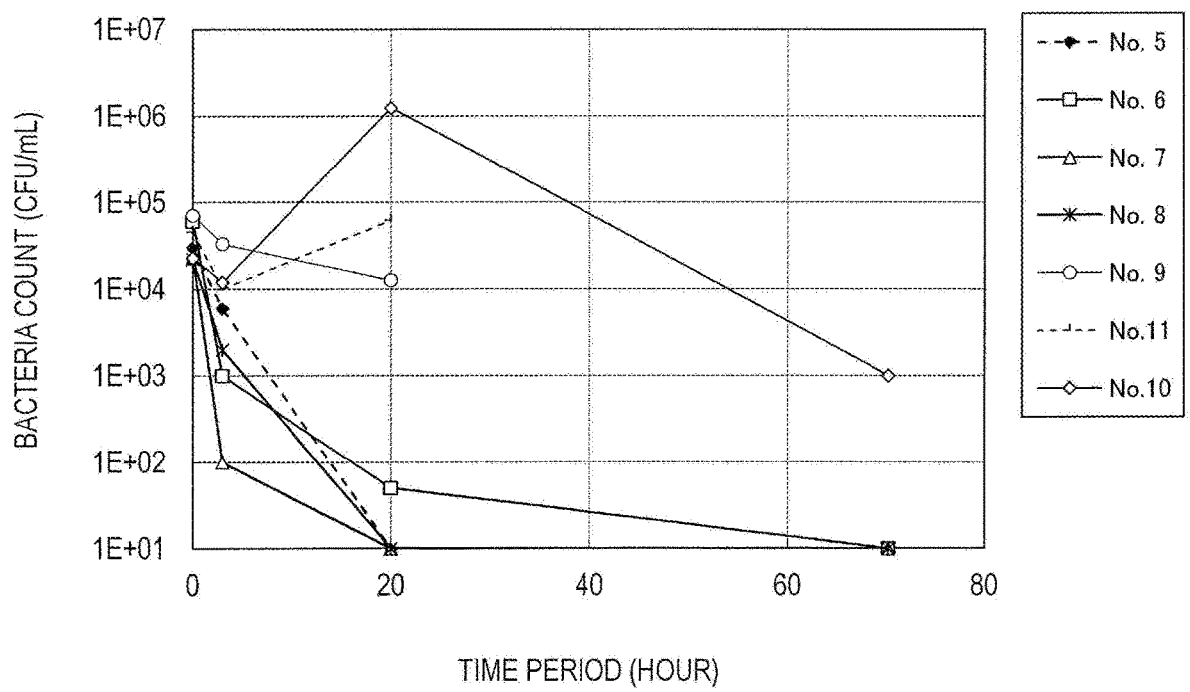
FIG. 8 Graph showing the results of evaluation of the microbicidal ability of respective sample films. The horizontal axis represents the time period for which the samples were left (hour), and the vertical axis represents the bacteria count (CFU/mL).

FIG. 8 is a graph showing the results of the evaluation of the microbicidal ability of the sample films. The horizontal axis represents the time period that the sample film was left (hour). The vertical axis represents the bacteria count (CFU/mL) in the bacterial dilution B'.

As clearly seen from FIG. 8, sample films No. 5, No. 6, No. 7 and No. 8 have more excellent bactericidal activities than sample No. 10 (commercially-available antimicrobial silver ion sheet). Sample film No. 9 and sample film No. 11 (PET) do not have the microbicidal ability. Although they were left for 70 hours and 15 minutes, the bacteria count increased to such a level that it was uncountable.

As seen from Table 3 below, it was verified that the microbicidal ability has a high correlation with the contact angle of the surface of the synthetic polymer film with respect to hexadecane and that, as previously described, the contact angle of hexadecane with respect to the surface of the synthetic polymer film is preferably not more than 51°, and more preferably not more than 31°. On the other hand, it was also verified that the hydrophilicity (or, conversely, hydrophobicity) of the surface of the synthetic polymer film which is evaluated by the contact angle of water does not directly relate to the microbicidal activity.

TABLE 3

| No. | SYNTHETIC POLYMER FILM (BASE FILM: PET) | CONTACT ANGLE OF WATER (°) | CONTACT ANGLE OF HEXADECANE (°) | MICROBICIDAL ABILITY |
|---|---|---|---|---|
| 5 | FLUORINE-CONTAINING ACRYLIC RESIN A | 133 | 29 | ○ |
| 6 | URETHANE ACRYLATE-CONTAINING ACRYLIC RESIN B WITH | 91 | 11 | ○ |

TABLE 3-continued

| No. | SYNTHETIC POLYMER FILM (BASE FILM: PET) | CONTACT ANGLE OF WATER (°) | CONTACT ANGLE OF HEXADECANE (°) | MICROBICIDAL ABILITY |
|---|---|---|---|---|
|  | FLUORIC LUBRICANT F2 ADDED + MOLD RELEASING AGENT R1 (0.1 mass %) | | | |
| 7 | URETHANE ACRYLATE-CONTAINING ACRYLIC RESIN B WITH FLUORIC LUBRICANT F2 ADDED | 13 | 11 | ○ |
| 8 | URETHANE ACRYLATE-CONTAINING ACRYLIC RESIN C | 13 | 8 | ○ |
| 9 | FLUORINE-CONTAINING ACRYLIC RESIN D | 150 | 71 | x |
| 10 | SILVER ION SHEET | 46 | 43 | Δ |
| 11 | PET | — | — | x |

In sample films No. 3 and No. 7 described above, the microbicidal effect of a urethane acrylate-containing acrylic resin to which a fluoric lubricant is added was verified. Also, the microbicidal effect of a synthetic polymer film which contains a silicone lubricant instead of the fluoric lubricant was verified, although the results of experiments are not shown herein. It was verified that acrylic resin E to which a silicone lubricant is added, which was used in sample film No. 12 that will be described later with reference to Table 4 shown below, has a microbicidal effect on $P.$ $aeruginosa$ bacteria (e.g., the bacteria count of $P.$ $aeruginosa$ bacteria was substantially zero in the post-wash solution after having been left for 24 hours). As seen from Table 4, the contact angle of sample film No. 12 with respect to hexadecane was not more than 51°, which is reportedly preferable in order that the synthetic polymer film has a microbicidal ability, and also was not more than 31°, which is reportedly more preferable.

As disclosed in International Application PCT/JP2015/081608 of the present applicant, a synthetic polymer film in which the concentration of the nitrogen element included in the surface is not less than 0.7 at % has an excellent microbicidal effect. The entire disclosure of International Application PCT/JP2015/081608 is incorporated by reference in this specification. For example, the synthetic polymer film may be formed using a resin material (e.g., urethane resin) in which the concentration of the nitrogen element is not less than 0.7 at %. For example, the surface of the synthetic polymer film may be treated with a surface treatment agent (including, for example, a silane coupling agent, a mold releasing agent, and an antistatic agent) in which the concentration of the nitrogen element is not less than 0.7 at %.

A synthetic polymer film according to an embodiment of the present invention is suitably applicable to uses of suppressing generation of slime on a surface which is in contact with water, for example. For example, the synthetic polymer film is attached onto the inner walls of a water container for a humidifier or ice machine, whereby generation of slime on the inner walls of the container can be suppressed. The slime is attributed to a biofilm which is formed of extracellular polysaccharide (EPS) secreted from bacteria adhering to the inner walls and the like. Therefore, killing the bacteria adhering to the inner walls and the like enables suppression of generation of the slime.

As described above, bringing a liquid into contact with the surface of a synthetic polymer film according to an embodiment of the present invention enables sterilization of the liquid. Likewise, bringing a gas into contact with the surface of a synthetic polymer film according to an embodiment of the present invention enables sterilization of the gas. In general, microorganisms have such a surface structure that they can easy adhere to the surface of an object in order to increase the probability of contact with organic substances which will be their nutrients. Therefore, when a liquid or gas which contains microorganisms is brought into contact with a microbicidal surface of a synthetic polymer film according to an embodiment of the present invention, the microorganisms are likely to adhere to the surface of the synthetic polymer film, and therefore, on that occasion, the liquid or gas is subjected to the microbicidal activity.

Although the microbicidal activity of a synthetic polymer film according to an embodiment of the present invention against $P.$ $aeruginosa$ that is a Gram-negative bacteria has been described in this section, the synthetic polymer film has a microbicidal activity not only on Gram-negative bacteria but also on Gram-positive bacteria and other microorganisms. One of the characteristics of the Gram-negative bacteria resides in that they have a cell wall including an exine. The Gram-positive bacteria and other microorganisms (including ones that do not have a cell wall) have a cell membrane. The cell membrane is formed by a lipid bilayer as is the exine of the Gram-negative bacteria. Therefore, it is estimated that the interaction between the raised portions of the surface of the synthetic polymer film according to an embodiment of the present invention and the cell membrane is basically the same as the interaction between the raised portions and the exine.

Note that, however, the size of the microorganisms varies depending on their types. The size of $P.$ $aeruginosa$ which has been described herein as an example is about 1 μm. However, the size of the bacteria ranges from several hundreds of nanometers to about five micrometers. The size of fungi is not less than several micrometers. It is estimated that the raised portions of the synthetic polymer film which has been described above (the two-dimensional size is about 200 nm) have a microbicidal activity on a microorganism whose size is not less than about 0.5 μm, but there is a probability that the raised portions are too large to exhibit a sufficient microbicidal activity on a bacterium whose size is several hundreds of nanometers. The size of viruses ranges from several tens of nanometers to several hundreds of nanometers, and many of them have a size of not more than 100 nm. Note that viruses do not have a cell membrane but have a protein shell called capsid which encloses virus nucleic acids. It is estimated that the raised portions likewise act on this shell.

In view of the above, the configuration and production method of a synthetic polymer film having raised portions which can exhibit a microbicidal activity against a microorganism of not more than several hundreds of nanometers are described below.

In the following description, raised portions of the above-described synthetic polymer film which have a two-dimensional size in the range of more than 20 nm and less than 500 nm are sometimes referred to as "first raised portions". Raised portions which are superimposedly formed over the first raised portions are referred to as "second raised portions". The two-dimensional size of the second raised portions is smaller than the two-dimensional size of the first raised portions and does not exceed 100 nm. Note that when the two-dimensional size of the first raised portions is less than 100 nm, particularly less than 50 nm, it is not necessary to provide the second raised portions. Recessed portions of the mold corresponding to the first raised portions are referred to as "first recessed portions", and recessed portions of the mold corresponding to the second raised portions are referred to as "second recessed portions".

When the method of forming the first recessed portions which have predetermined size and shape by alternately performing the anodization step and the etching step as described above is applied without any modification, the second recessed portions cannot be formed successfully.

Figure 7:
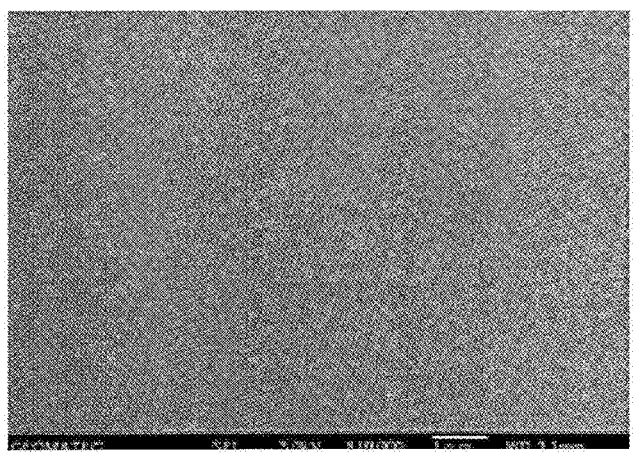
FIG. 7(a) shows a SEM image of a surface of an aluminum base. (b) shows a SEM image of a surface of an aluminum film. (c) shows a SEM image of a cross section of the aluminum film.
Figure 7:
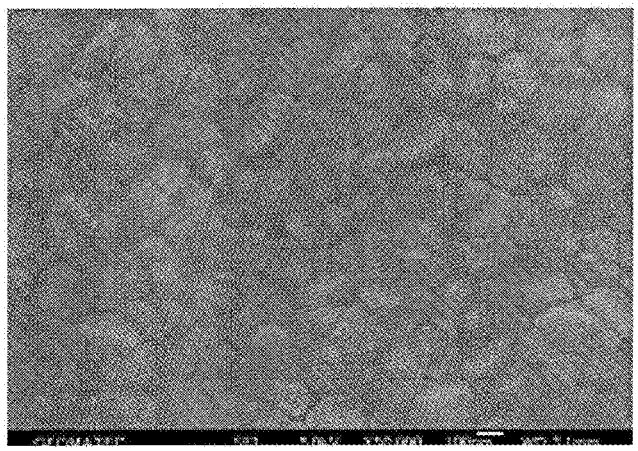
Figure 7:
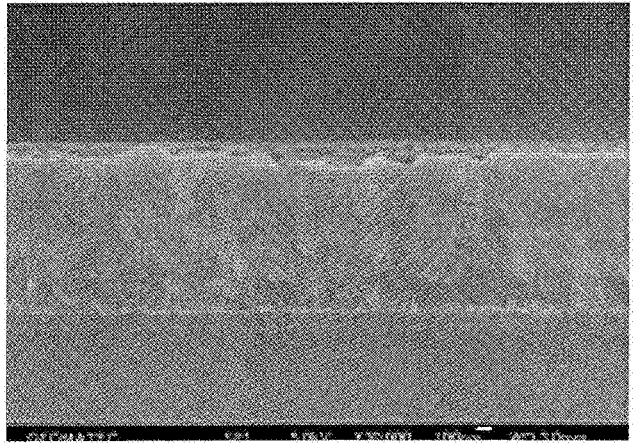

FIG. 7(a) shows a SEM image of a surface of an aluminum base (designated by reference numeral 12 in FIG. 2A). FIG. 7(b) shows a SEM image of a surface of an aluminum film (designated by reference numeral 18 in FIG. 2A). FIG. 7(c) shows a SEM image of a cross section of the aluminum film (designated by reference numeral 18 in FIG. 2A). As seen from these SEM images, there are grains (crystal grains) at the surface of the aluminum base and the surface of the aluminum film. The grains of the aluminum film form unevenness at the surface of the aluminum film. This unevenness at the surface affects formation of the recessed portions in the anodization and therefore interrupts formation of second recessed portions whose Dp or Dint is smaller than 100 nm.

In view of the above, a mold manufacturing method according to an embodiment of the present invention includes: (a) providing an aluminum base or an aluminum film deposited on a support; (b) the anodization step of applying a voltage at the first level while a surface of the aluminum base or aluminum film is kept in contact with an electrolytic solution, thereby forming a porous alumina layer which has the first recessed portions; (c) after step (b), the etching step of bringing the porous alumina layer into contact with an etching solution, thereby enlarging the first recessed portions; and (d) after step (c), applying a voltage at the second level that is lower than the first level while the porous alumina layer is kept in contact with an electrolytic solution, thereby forming the second recessed portions in the first recessed portions. For example, the first level is higher than 40 V, and the second level is equal to or lower than 20 V.

Specifically, an anodization step is carried out with the voltage at the first level, whereby the first recessed portions are formed which have such a size that is not influenced by the grains of the aluminum base or aluminum film. Thereafter, the thickness of the barrier layer is decreased by etching, and then, another anodization step is carried out with the voltage at the second level that is lower than the first level, whereby the second recessed portions are formed in the first recessed portions. When the second recessed portions are formed through such a procedure, the influence of the grains is avoided.

Figure 9:
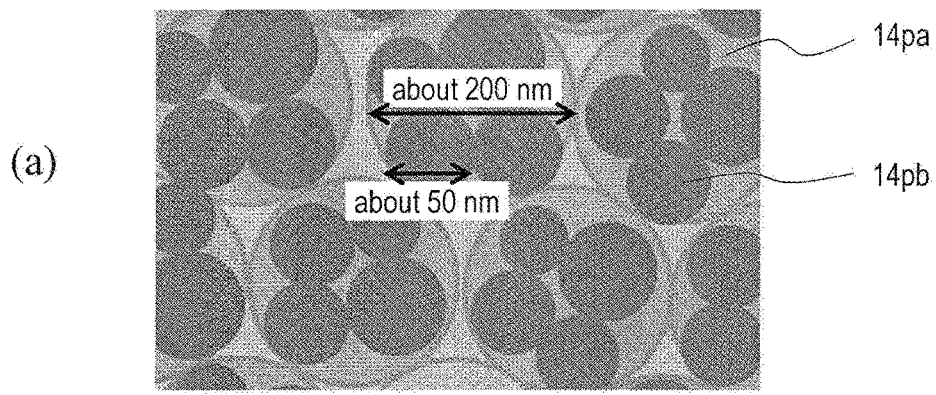
FIG. 9(a) is a schematic plan view of a porous alumina layer of a mold. (b) is a schematic cross-sectional view of the porous alumina layer. (c) is a SEM image of a mold manufactured as a trial piece.
Figure 9:
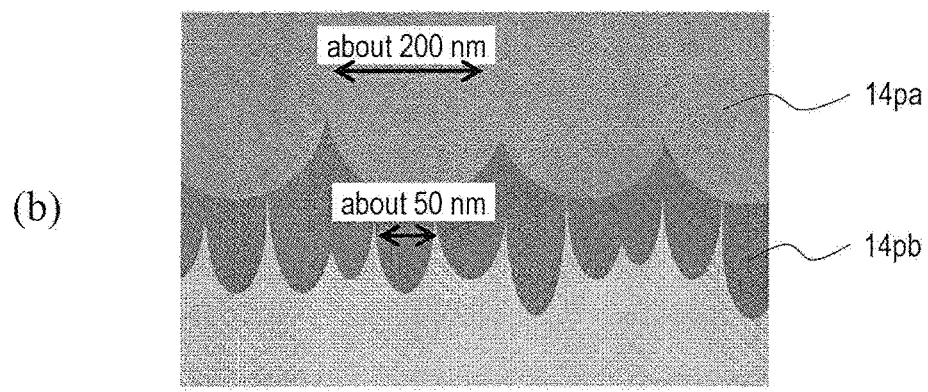
Figure 9:
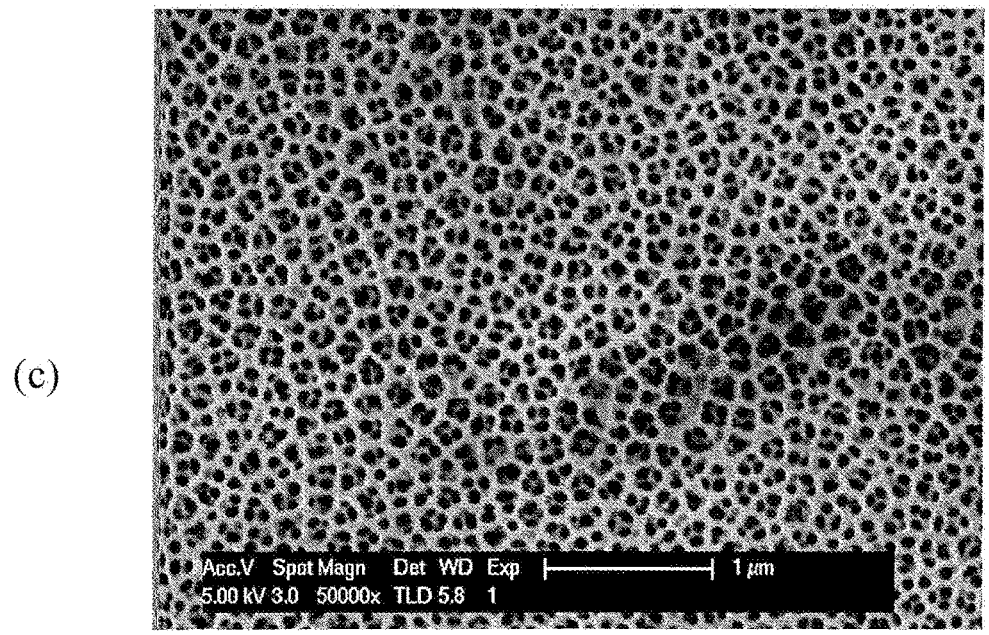

A mold which has first recessed portions 14$pa$ and second recessed portions 14$pb$ formed in the first recessed portions 14$pa$ is described with reference to FIG. 9. FIG. 9(a) is a schematic plan view of a porous alumina layer of a mold. FIG. 9(b) is a schematic cross-sectional view of the porous alumina layer. FIG. 9(c) shows a SEM image of a prototype mold.

As shown in FIGS. 9(a) and 9(b), the surface of the mold of the present embodiment has the plurality of first recessed portions 14$pa$ whose two-dimensional size is in the range of more than 20 nm and less than 500 nm and the plurality of second recessed portions 14$pb$ which are superimposedly formed over the plurality of first recessed portions 14$pa$. The two-dimensional size of the plurality of second recessed portions 14$pb$ is smaller than the two-dimensional size of the plurality of first recessed portions 14$pa$ and does not exceed 100 nm. The height of the second recessed portions 14$pb$ is, for example, more than 20 nm and not more than 100 nm. The second recessed portions 14$pb$ preferably have a generally conical portion as do the first recessed portions 14$pa$.

The porous alumina layer shown in FIG. 9(c) was formed as described below.

The aluminum film used was an aluminum film which contains Ti at 1 mass %. The anodization solution used was an oxalic acid aqueous solution (concentration: 0.3 mass %, solution temperature: 10° C.). The etching solution used was a phosphoric acid aqueous solution (concentration: 10 mass %, solution temperature: 30° C.). After the anodization was carried out with a voltage of 80 V for 52 seconds, the etching was carried out for 25 minutes. Then, the anodization was carried out with a voltage of 80 V for 52 seconds, and the etching was carried out for 25 minutes. Thereafter, the anodization was carried out with a voltage of 20 V for 52 seconds, and the etching was carried out for 5 minutes. Further, the anodization was carried out with a voltage of 20 V for 52 seconds.

As seen from FIG. 9(c), the second recessed portions whose Dp was about 50 nm were formed in the first recessed portions whose Dp was about 200 nm. When in the above-described manufacturing method the voltage at the first level was changed from 80 V to 45 V for formation of the porous alumina layer, the second recessed portions whose Dp was about 50 nm were formed in the first recessed portions whose Dp was about 100 nm.

When a synthetic polymer film is produced using such a mold, the produced synthetic polymer film has raised portions whose configuration is the inverse of that of the first recessed portions 14$pa$ and the second recessed portions 14$pb$ shown in FIGS. 9(a) and 9(b). That is, the produced synthetic polymer film further includes a plurality of second raised portions superimposedly formed over a plurality of first raised portions.

The thus-produced synthetic polymer film which has the first raised portions and the second raised portions superimposedly formed over the first raised portions has a microbicidal activity on various microorganisms, ranging from relatively small microorganisms of about 100 nm to relatively large microorganisms of not less than 5 μm.

As a matter of course, only raised portions whose two-dimensional size is in the range of more than 20 nm and less than 100 nm may be formed according to the size of a target microorganism. The mold for formation of such raised portions can be manufactured, for example, as described below.

The anodization is carried out using a neutral salt aqueous solution (ammonium borate, ammonium citrate, etc.), such as an ammonium tartrate aqueous solution, or an organic acid which has a low ionic dissociation degree (maleic acid, malonic acid, phthalic acid, citric acid, tartaric acid, etc.) to form a barrier type anodized film. After the barrier type anodized film is removed by etching, the anodization is carried out with a predetermined voltage (the voltage at the second level described above), whereby recessed portions whose two-dimensional size is in the range of more than 20 nm and less than 100 nm can be formed.

For example, an aluminum film which contains Ti at 1 mass % is anodized at 100 V for 2 minutes using a tartaric acid aqueous solution (concentration: 0.1 mol/L, solution temperature: 23° C.), whereby a barrier type anodized film is formed. Thereafter, the etching is carried out for 25 minutes using a phosphoric acid aqueous solution (concentration: 10 mass %, solution temperature: 30° C.), whereby the barrier type anodized film is removed. Thereafter, the anodization and the etching are alternatively repeated as described above, specifically through 5 anodization cycles and 4 etching cycles. The anodization was carried out at 20 V for 52 seconds using an oxalic acid aqueous solution (concentration: 0.3 mass %, solution temperature: 10° C.) as the anodization solution. The etching was carried out for 5 minutes using the above-described etching solution. As a result, recessed portions whose two-dimensional size is about 50 nm can be formed.

A synthetic polymer film of an embodiment of the present invention is applicable to various uses. For example, the synthetic polymer film is also suitably applicable to wrapping, preserving and handling of food. The synthetic polymer film of an embodiment of the present invention is capable of at least suppressing or preventing multiplication of microorganisms (including, for example, bacteria, viruses and protozoans) mixed in food.

Hereinafter, it is explained with experimental examples that a synthetic polymer film which has the above-described moth-eye structure over its surface has a microbicidal effect and/or antimicrobial effect on meat.

In experiments 1 to 6 which will be described in the following section, sample films No. 12 and No. 13 shown in Table 4 below were evaluated as to the microbicidal effect on meat. The contact angles of the surface of sample films No. 12 and No. 13 with respect to water and hexadecane were measured through the same procedure as that adopted for table 1 and table 3 presented above. Sample film No. 12 was produced using acrylic resin E to which a silicone lubricant was added, with the use of the same mold as that described in the previous section. Sample film No. 13 was a PET film which was the same as that used as the base film of sample film No. 12.

TABLE 4

| No. | SYNTHETIC POLYMER FILM (BASE FILM: PET) | CONTACT ANGLE OF WATER (°) | CONTACT ANGLE OF HEXADECANE (°) |
| --- | --- | --- | --- |
| 12 | ACRYLIC RESIN E WITH SILICONE LUBRICANT ADDED | 12.7 | 10.8 |
| 13 | PET | 61.0 | 9.0 |

(Experiment 1)

In Experiment 1 and Experiment 2, the microbicidal effect on bacteria contained in a slice of meat (pork) was evaluated. The evaluation of the microbicidal ability was carried out through the following procedure.

1. A 10 g piece was weighed out from a slice of pork. To carry out the experiment under as uniform conditions as possible, the piece was cut out from a low-fat portion of the pork slice.

2. 20 mL phosphate buffer saline (PBS) was put into a filter bag, and then, the meat piece prepared at step 1 was also put into the filter bag.

3. The meat piece was rubbed with hands over the filter bag such that the phosphate buffer saline soaks into the meat piece. This step was performed using a refrigerant such that heat does not transfer from the hands to the meat piece. The phosphate buffer saline in the filter bag after this rubbing step is hereinafter referred to as "bacterial dilution α".

4. 9 mL phosphate buffer saline was added to 1 mL bacterial dilution α, whereby bacterial dilution α was diluted 10-fold. The same diluting procedure was repeated such that bacterial dilution α was diluted 100-fold, whereby bacterial dilution β was prepared.

5. A 400 μL drop of the bacterial dilution β was placed on each of sample films No. 12 and No. 13. A cover was placed over the dropped bacterial dilution β to adjust the amount of the bacterial dilution β per unit area.

6. To examine the results after the samples are left for three different time periods (0 hour (5 minutes), 20 hours and 72 hours), three sets of the covered film sample described at step 5 were prepared for each of the sample films.

The procedure of steps 1 to 6 was carried out with the meat piece being cooled in an expanded polystyrene container in which a refrigerant was placed. This is because the temperature of the meat piece is prevented from increasing during the procedure.

7. Each of the samples was put into a lidded case and left in a refrigerator (2° C. to 5° C.) for a predetermined time period. To prevent drying of the samples, absorbent cotton wetted with 200 μL phosphate buffer saline was also placed in the lidded case.

8. After having been left for the predetermined time periods (0 hour (5 minutes), 20 hours and 72 hours), the number of bacteria was counted through the following steps 9 to 14.

9. 9.6 mL phosphate buffer saline was put into a filter bag, and then, a sample film was also put into the filter bag.

10. The filter bag was stored in a refrigerator (2° C. to 5° C.) for about 30 minutes. During this period, the phosphate buffer saline was cooled and allowed to soak into the film and the meat piece.

11. Thereafter, the sample film was rubbed with hands over the filter bag to sufficiently wash away the bacteria from the sample film. The phosphate buffer saline in the filter bag after this washing step is referred to as "bacterial dilution γ". Here, after the passage of 0 hours, the bacterial dilution γ was a 25-fold dilution of the bacterial dilution β. That is, after the passage of 0 hours, the bacterial dilution γ was a (2.5E+03)-fold dilution of the bacterial dilution α.

12. 1.08 mL phosphate buffer saline was added to 120 μL bacterial dilution γ, whereby a 10-fold dilution (bacterial dilution δ) was obtained. 1.08 mL phosphate buffer saline was added to 120 μL bacterial dilution δ, whereby a 10-fold dilution (bacterial dilution ε) was obtained. After the passage of 0 hours, the bacterial dilution δ was a (2.5E+04)-fold dilution of the bacterial dilution α, and the bacterial dilution ε was a (2.5E+05)-fold dilution of the bacterial dilution α.

13. A 1 mL drop of the bacterial dilution γ, a 1 mL drop of the bacterial dilution δ, and a 1 mL drop of the bacterial dilution ε were each placed on a Petrifilm™ medium (product name: Aerobic Count Plate (AC), manufactured by 3M). The bacteria were cultured at 37° C. with the relative humidity of 100%. After 72 hours, the number of bacteria per 1 g meat was counted. It is estimated that the cultured bacteria can include, for example, common bacteria adhering to the pork, e.g., *Salmonella* bacteria, pathogenic *E. coli* (including enterohemorrhagic *E. coli* (e.g., O157)), and *Staphylococcus aureus*. Here, *Salmonella* bacteria and pathogenic *E. coli* are Gram-negative bacteria, and *Staphylococcus aureus* is a Gram-positive bacterium.

Figure 10:
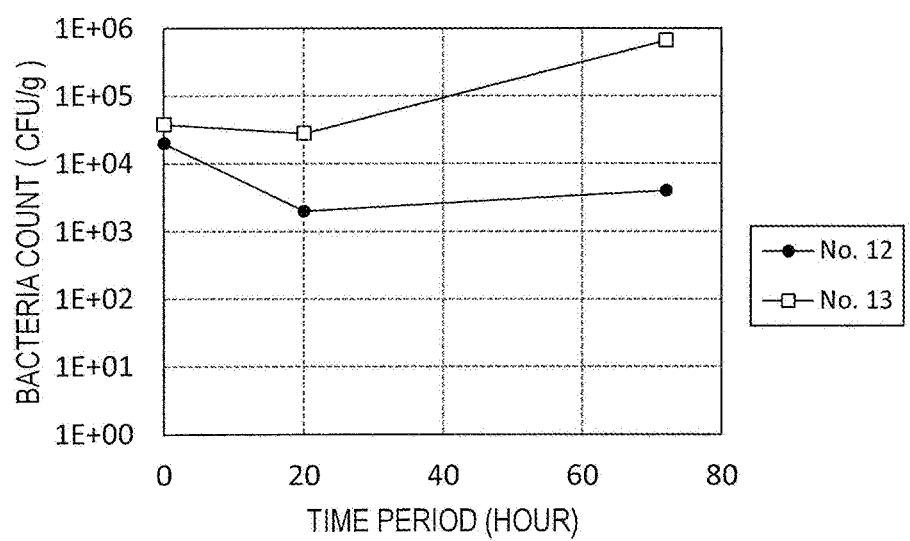
FIG. 10 Graph showing the results of evaluation of the microbicidal ability of sample films No. 12 and No. 13. The horizontal axis represents the time period for which the samples were left (hour), and the vertical axis represents the bacteria count (CFU/g).

The results are shown in FIG. 10. FIG. 10 is a graph showing the results of evaluation of the microbicidal effect of sample films No. 12 and No. 13. The horizontal axis represents the time period for which the samples were left (hour), and the vertical axis represents the bacteria count (CFU/g). The bacteria count is a value per 1 g meat.

As seen from FIG. 10, in sample film No. 12, the bacteria count decreased with transition of the time period from 0 hour (5 minutes) to 20 hours. It is seen that, with transition of the time period from 20 hours to 72 hours, the increase of the bacteria count is suppressed as compared with sample film No. 13, although the bacteria count did not decrease. It is seen that sample film No. 12 has a microbicidal effect and/or the effect of suppressing the increase of the bacteria count (antimicrobial effect) on meat.

(Experiment 2)

In Experiment 2, a slice of pork (10 g) which was left for 8 hours at 25° C. was used. The procedure of evaluation of the microbicidal effect was basically the same as in Experiment 1. Note that, however, the step of rubbing the meat piece such that the phosphate buffer saline soaks into the meat piece (Step 3 of Experiment 1) was carried out without using a refrigerant. The procedure of Steps 1 to 6 was different from Experiment 1 in that Steps 1 to 6 were carried out without using an expanded polystyrene container in which a refrigerant was placed but at a normal temperature (room temperature). The procedure of step 10 was different from Experiment 1 in that the meat piece was left for about 30 minutes at a normal temperature (room temperature).

As a result of the experiment, in Experiment 2, none of sample films No. 12 and No. 13 produced a microbicidal effect. In sample films No. 12 and No. 13, the bacteria count after having been left for 0 hour (5 minutes) was more than 1.0E+05 CFU/g. This value is about 10 times the value of Experiment 1. In sample films No. 12 and No. 13, the bacteria count after having been left for 20 hours was greater than the bacteria count after having been left for 0 hour (5 minutes) (more than 1.0E+06 CFU/g). In Experiment 2, the bacteria count after having been left for 0 hour (5 minutes) was greater than in Experiment 1, and thus, it can be concluded that the microbicidal effect was not sufficiently obtained. The relationship between the bacteria count after having been left for 0 hour (5 minutes) (also referred to as "the initial bacteria count") and the microbicidal effect which will be described later.

(Experiment 3)

Next, in Experiment 3 and Experiment 4, the microbicidal effect on bacteria contained in minced meat (beef) was evaluated. The evaluation of the microbicidal effect was carried out through the following procedure.

1. 0.30 g (±0.01 g) minced beef was weighed out. The minced beef was sandwiched by two 5 cm×5 cm sheets of sample film No. 12. In this sandwiching step, raised portions of the sample film sheets opposed each other such that the raised portions were in contact with the minced meat. The sample film sheet was pressed from above such that the minced meat per unit area was 60 mg/cm². In order that the results after the samples were left for three different time periods (0 hour (5 minutes), 20 hours and 72 hours) were examined in two samples for each time period, six samples in total were prepared for sample film No. 12.

2. Also for sample film No. 13, six samples were prepared likewise.

3. To examine a case where the meat is not sandwiched by film sheets, 6 samples of 0.30 g minced beef wrapped with a plastic wrap (sample No. 14) were prepared. Drying of the meat was prevented by wrapping the meat with a plastic wrap. Sample No. 14 is different from sample film No. 13 in the surface area at which the minced meat was in contact with the film (plastic wrap) and the shape of the minced meat. That is, in sample film No. 13, the minced meat is flattened between the film sheets such that the contact area with the film is large. In sample No. 14, the surface area at which the minced meat was in contact with the plastic wrap is small.

The procedure of steps 1 to 3 was carried out with the meat being cooled in an expanded polystyrene container in which a refrigerant was placed. This is because the temperature of the meat is prevented from increasing during the procedure.

4. Each of the samples was put into a lidded case and left in a refrigerator (2° C. to 5° C.) for a predetermined time period. To prevent drying of the samples, absorbent cotton wetted with 200 μL phosphate buffer saline was also placed in the lidded case.

5. After having been left for the predetermined time periods (0 hour (5 minutes), 20 hours and 72 hours), the number of bacteria was counted through the following steps 6 to 11.

6. 30 mL phosphate buffer saline was put into a filter bag. The samples of sample films No. 12 and No. 13, meat sandwiched by two film sheets, were disassembled by peeling off one film sheet, and the two film sheets were put into the filter bag such that a side of the film sheets carrying the meat was exposed. As for sample No. 14, unwrapped meat was put into a filter bag.

7. The filter bag was stored in a refrigerator (2° C. to 5° C.) for about 30 minutes. During this period, the phosphate buffer saline was cooled and allowed to soak into the film and the meat piece.

8. Thereafter, the film sheets were rubbed with hands over the filter bag to sufficiently wash away the bacteria from the film sheets and the meat. The phosphate buffer saline in the filter bag after this washing step is referred to as "bacterial dilution A2".

9. 120 μL bacterial dilution A2 was added to 1.08 mL phosphate buffer saline, whereby a 10-fold dilution was obtained. The resultant solution is again diluted 10-fold in the same way, whereby bacterial dilution B2 was prepared. That is, bacterial dilution B2 was a 100-fold dilution of bacterial dilution A2.

10. Dilution is performed likewise, whereby the bacterial dilution B2 was diluted 10-fold to prepare bacterial dilution C2, and the bacterial dilution C2 was diluted 10-fold to prepare bacterial dilution D2.

11. A 1 mL drop of the bacterial dilution A2, a 1 mL drop of the bacterial dilution C2, and a 1 mL drop of the bacterial dilution D2 were each placed on a Petrifilm™ medium (product name: Aerobic Count Plate (AC), manufactured by 3M). The bacteria were cultured at 37° C. with the relative humidity of 100%. After 72 hours, the number of bacteria per 1 g meat was counted. It is estimated that the cultured bacteria can include, for example, common bacteria contained in the minced beef, e.g., *Salmonella* bacteria, pathogenic *E. coli* (including enterohemorrhagic *E. coli* (e.g., O157)), and *Staphylococcus aureus*. Here, *Salmonella* bacteria and pathogenic *E. coli* are Gram-negative bacteria, and *Staphylococcus aureus* is a Gram-positive bacterium.

Figure 11:
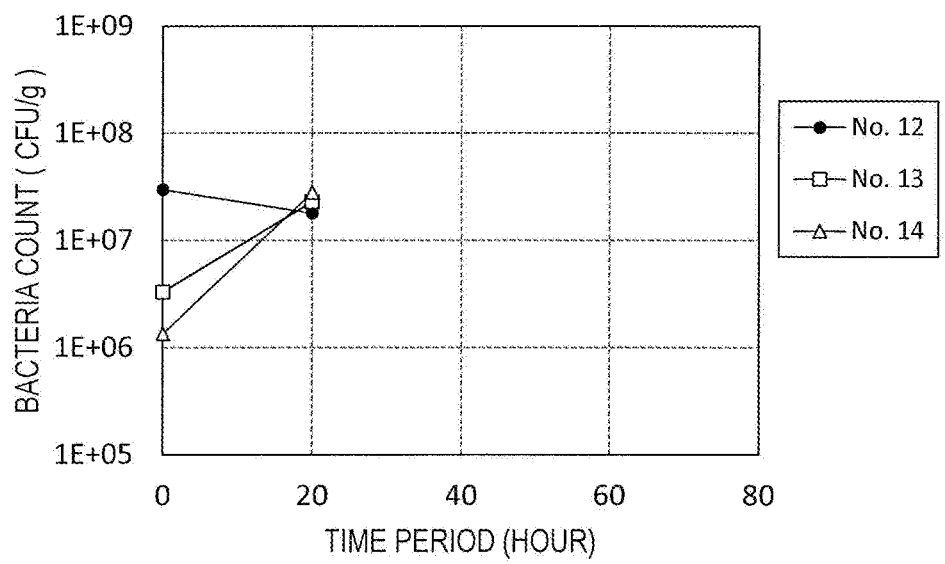
FIGS. 11(a) and (b) are graphs showing the results of evaluation of the microbicidal ability of sample films No. 12 and No. 13 and sample No. 14. The horizontal axis represents the time period for which the samples were left (hour), and the vertical axis represents the bacteria count (CFU/g).
Figure 11:
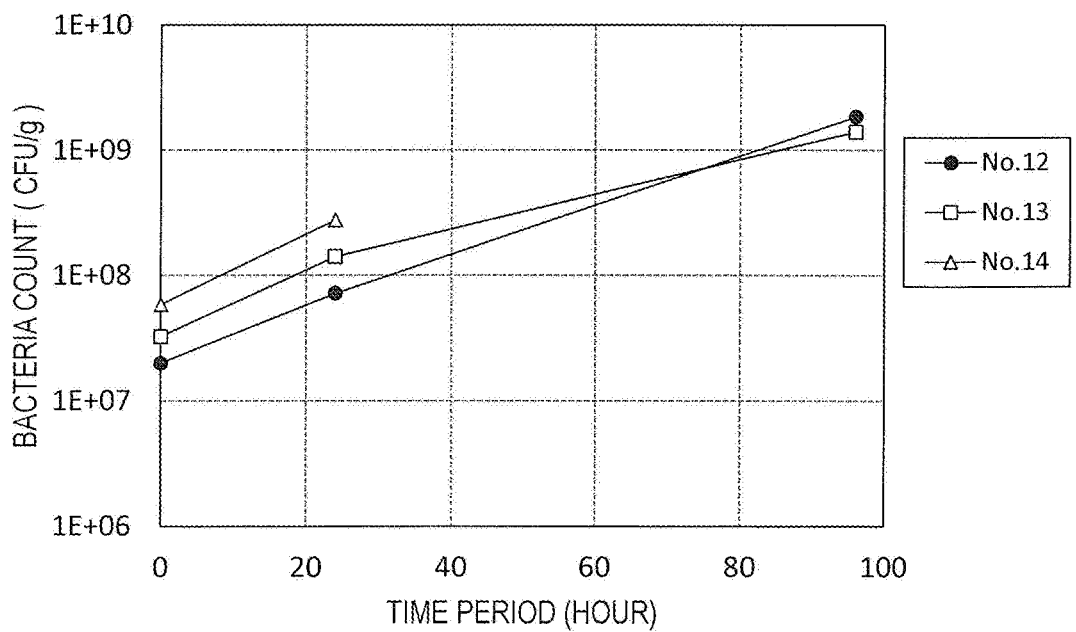

The results are shown in FIG. 11(*a*). FIG. 11(*a*) is a graph showing the results of evaluation of the microbicidal effect of sample films No. 12 and No. 13 and sample No. 14. The horizontal axis represents the time period for which the samples were left (hour), and the vertical axis represents the bacteria count (CFU/g). The bacteria count is a value per 1 g meat.

Here, in FIG. 11(*a*), of each of sample films No. 12 and No. 13 and sample No. 14, the result obtained after the respective time periods was the average for values obtained from two samples. The obtained specific values are as follows. In sample film No. 12, the bacteria count values obtained after having been left for 0 hour (5 minutes) were 5.5E+07 CFU/g and 4.7E+06 CFU/g, and the bacteria count values obtained after having been left for 20 hours were 1.8E+07 CFU/g and 1.8E+07 CFU/g. In sample film No. 13, the bacteria count values obtained after having been left for 0 hour (5 minutes) were 1.0E+06 CFU/g and 5.6E+06 CFU/g, and the bacteria count values obtained after having been left for 20 hours were 2.0E+07 CFU/g and 2.6E+07 CFU/g. In sample No. 14, the bacteria count values obtained after having been left for 0 hour (5 minutes) were 2.0E+06 CFU/g and 6.9E+05 CFU/g, and the bacteria count values obtained after having been left for 20 hours were 2.8E+07 CFU/g and a value which was too much to count. In sample films No. 12 and No. 13 and sample No. 14, the number of bacteria after having been left for 72 hours was not counted.

As seen from FIG. 11(*a*), none of sample film No. 13 and sample No. 14 produced a microbicidal effect. No significant difference was found between the results of sample film No. 13 and sample No. 14. In sample film No. 12, the bacteria count decreased after having been left for 20 hours. Note that, however, considering that the bacteria count after having been left for 0 hour (5 minutes) was greater than in sample film No. 13 and sample No. 14 and that the bacteria count after having been left for 20 hours was generally equal to those of sample film No. 13 and sample No. 14, it was not verified that sample film No. 12 had a sufficient microbicidal effect. In Experiment 3, the bacteria count after having been left for 0 hour (5 minutes) was on the order of 1.0E+06 CFU/g to 1.0E+07 CFU/g, i.e., greater than in Experiment 1 (for example, about 100 times that of Experiment 1), and therefore, it can be concluded that the microbicidal effect was not sufficiently achieved. The relationship between the initial bacteria count and the microbicidal effect will be described later.

(Experiment 4)

In Experiment 4, the procedure of evaluation of the microbicidal effect was basically the same as in Experiment 3. Note that, however, the procedure of Steps 1 to 3 was different from Experiment 3 in that Steps 1 to 3 were carried out without using an expanded polystyrene container in which a refrigerant was placed but at a normal temperature (room temperature). The time periods for which the samples were left at Step 5 were 0 hour (5 minutes), 24 hours and 96 hours.

The results are shown in FIG. 11(*b*). FIG. 11(*b*) is a graph showing the results of evaluation of the microbicidal effect of sample films No. 12 and No. 13 and sample No. 14. The horizontal axis represents the time period for which the samples were left (hour), and the vertical axis represents the bacteria count (CFU/g). The bacteria count is a value per 1 g meat.

Here, of each of sample films No. 12 and No. 13 and sample No. 14, the results obtained after the respective time periods were examined in two samples. FIG. 11(*b*) shows the average for values obtained from two samples. The obtained specific values are as follows. In sample film No. 12, the bacteria count values obtained after having been left for 0 hour (5 minutes) were 2.6E+07 CFU/g and 1.4E+07 CFU/g, the bacteria count values obtained after having been left for 24 hours were 9.6E+07 CFU/g and 4.8E+07 CFU/g, and the bacteria count values obtained after having been left for 96 hours were 1.8E+09 CFU/g and 1.9E+09 CFU/g. In sample film No. 13, the bacteria count values obtained after having been left for 0 hour (5 minutes) were 3.0E+07 CFU/g and 3.5E+07 CFU/g, the bacteria count values obtained after having been left for 24 hours were 2.0E+08 CFU/g and 8.3E+07 CFU/g, and the bacteria count values obtained after having been left for 96 hours were 1.2E+09 CFU/g and 1.6E+09 CFU/g. In sample film No. 14, the bacteria count values obtained after having been left for 0 hour (5 minutes) were 9.7E+07 CFU/g and 2.0E+07 CFU/g, and the bacteria count values obtained after having been left for 24 hours were 1.4E+08 CFU/g and 4.1E+08 CFU/g. In sample No. 14, the bacteria count after having been left for 96 hours was not measured.

As seen from FIG. 11(*b*), none of sample films No. 12 and No. 13 and sample No. 14 produced a microbicidal effect. In Experiment 4, the bacteria count after having been left for 0 hour (5 minutes) was on the order of 1.0E+07 CFU/g, i.e., still greater than in Experiment 3.

The present inventors examined the relationship between the initial bacteria count and the microbicidal effect as described below.

Growth of bacteria proceeds in such a manner that one bacterium divides into two every generation time $T_0$ so that the number of bacteria doubles. That is, as represented by formula (1) below, the number of bacteria at time $t=nT_0$, $N(nT_0)$, is twice the number of bacteria at time $t=(n-1)T_0$, $N((n-1)T_0)$. Here, n is a positive integer.

[Equation 1]

$$N(nT_0)=2N((n-1)T_0) \quad (1)$$

Generation time $T_0$ varies depending on the type of the bacterium and the culture conditions. For example, the generation time of *P. aeruginosa* under conditions suitable to growth is about 30 minutes to 40 minutes. For example, the generation time of *Salmonella* bacteria in a slice of beef at 8° C. is about 35 hours. The generation time of *Salmonella* bacteria in a slice of beef at 20° C. is about 2.2 hours. The generation time of *Salmonella* bacteria in minced pork at 10° C. is about 12 hours. Formula (1) can be expressed as formula (2) using the number of bacteria at time $t=0$, $N(0)$.

[Equation 2]

$$N(nT_0)=2^n\{N(0)\} \quad (2)$$

From formula (2), the number of bacteria at time t, N(t), can be expressed as formula (3). The number of bacteria logarithmically increases with the passage of time.

[Equation 3]

$$N(t)=2^{t/T_0}\{N(0)\} \quad (3)$$

The number of bacteria on a synthetic polymer film which has a microbicidal effect is examined based on the above-described concept of growth. Where D is the number of bacteria killed at the surface of the synthetic polymer film (sample film) per unit time, the number of bacteria at time $t=nT_0$, $N(nT_0)$, can be expressed as formula (4) shown below.

[Equation 4]

$$N(nT_0)=2N((n-1)T_0)-DT_0 \qquad (4)$$

Formula (4) is formed by introducing a term which represents the microbicidal effect ($-DT_0$) to formula (1) shown above. Formula (4) can be modified into formula (5).

[Equation 5]

$$N(nT_0)=DT_0+2^n\{N(0)-DT_0\} \qquad (5)$$

From formula (5), the number of bacteria at time t, N(t), can be expressed as formula (6).

[Equation 6]

$$N(t)=DT_0+2^{t/T_0}\{N(0)-DT_0\} \qquad (6)$$

According to formula (6), the number of bacteria at time t, N(t), is determined depending on which of the number of bacteria at time $t=0$ (i.e., initial bacteria count), N(0), and the number of bacteria killed per generation time, $DT_0$, is greater than the other. If the initial bacteria count N(0) is greater than the number of bacteria killed per generation time $DT_0$ ($N(0)>DT_0$), the number of bacteria continues to increase with time t. If the initial bacteria count N(0) is smaller than the number of bacteria killed per generation time $DT_0$ ($N(0)<DT_0$), the number of bacteria decreases with time t. After the passage of a finite time period, the number of bacteria becomes 0.

As described above, the microbicidal effect and/or antimicrobial effect of sample film No. 12 was verified in experiment 1, while in experiment 2 in which the initial bacteria count was large, the microbicidal effect of sample film No. 12 was not sufficiently achieved. These results can be explained according to formula (6). It is estimated that the initial bacteria count in experiment 1 was smaller than the number of bacteria per generation time sample film No. 12 can kill, while the initial bacteria count in experiment 2 was greater than the number of bacteria per generation time sample film No. 12 can kill. Likewise, it is estimated that since the initial bacteria count was also large in experiment 3 and experiment 4, sample film No. 12 did not produce a microbicidal effect.

It is generally considered that the bacteria count is larger in minced meat than in a slice of meat. This is attributed to, for example, the following causes: in a processing step, bacteria adhering to the surface of meat are likely to enter into the meat; in the processing step, a large area of meat is exposed to air; and in the processing step, the cell tissue is broken so that the amount of the nutrient source for bacteria can increase. As previously described in the foregoing with an example of *Salmonella* bacteria, in general, the generation time of *Salmonella* bacteria is shorter, i.e., the growth rate of *Salmonella* bacteria is greater, in minced meat than in a slice of meat. As previously described, in the experimental example, the synthetic polymer film of an embodiment of the present invention did not exhibit a microbicidal effect on meat of a large initial bacteria count (e.g., minced meat or meat left for a certain period of time at a normal temperature). It can be concluded that the synthetic polymer film of an embodiment of the present invention can be more suitably used for, for example, a block of meat or a slice of meat rather than minced meat or restructured meat.

Note that formula (6) is a simplified model, and therefore, factors which are not reflected in formula (6) need to be considered in some cases. For example, although in formula (6) the number of bacteria killed per unit time, D, is constant irrespective of the number of bacteria, there is a probability that it varies depending on the number of bacteria. The influence of the amount of the nutrient source for bacteria (e.g., organic substance) on the microbicidal effect also needs to be considered in some cases. In general, according to for example the Monod equation, the growth rate increases as the nutrient source increases. That is, generation time $T_0$ becomes shorter as the nutrient source increases. In this case, as seen from formula (6), the initial bacteria count needs to be smaller for achieving a microbicidal effect.

Microorganisms generally have a surface structure which is capable of easily attaching to the surface of an object in order to increase the probability of being in contact with an organic substance that is the nutrient source. Therefore, it is estimated that in an environment where the amount of the nutrient source is small, the probability of attaching to the object surface can increase. There is a probability that this enables more efficient sterilization at the surface of the synthetic polymer film.

A cell generally has the mechanism of taking a polar substance (including a nutrient source) into the cell (endocytosis). Actually, as described above with reference to FIG. 5, the raised portions of synthetic polymer film appear to be taken into the cell wall. When the amount of the nutrient source is small, it is also probable that the efficiency of taking the raised portions of the synthetic polymer film into the cell wall is amplified, so that bacteria are efficiently killed at the surface of the synthetic polymer film.

Note that, when bacteria are cultured, the bacteria do not necessarily logarithmically grow as described by formula (1) to formula (6) for all of the culture times. Before a logarithmic phase (exponential growth phase) such as described by formula (1) to formula (6), a lag phase sometimes occurs in which the number of bacteria rarely varies. The lag phase is a period where bacteria rarely divide. This period is considered to be for preparation for division (e.g., cell repairing, biosynthesis of enzymes) and adaptation to the medium. For example, according to the results of experiment 1 shown in FIG. 10, in sample film No. 12, the bacteria count decreased after the sample film was left for 20 hours but increased after the sample film was left for 72 hours. Such a behavior may reflect the transition from the lag phase to the logarithmic phase.

Growth of bacteria generally has a tendency to be more active as the temperature increases. As the temperature decreases, the generation time and the lag phase increase, and the growth rate in the logarithmic phase can decrease. For example, the generation time of *Salmonella* bacteria in a slice of beef is 35 hours when the temperature is 8° C., and is 2.2 hours when the temperature is 20° C. It is estimated that a synthetic polymer film of an embodiment of the present invention produces an excellent microbicidal effect in, for example, a low-temperature environment, i.e., under the condition that the generation time and the lag phase are long.

In Experiment 1 to Experiment 4 described above, it was verified that a synthetic polymer film of an embodiment of the present invention has a certain level of microbicidal effect and/or antimicrobial effect (the effect of suppressing growth of bacteria) on bacteria contained in meat. Particularly, it was verified that a synthetic polymer film of an embodiment of the present invention can be suitably used for a block or slice of meat in which the initial bacteria count is relatively small.

(Experiment 5)

In Experiment 5 and Experiment 6 which will be described in the following sections, the microbicidal effect and the antimicrobial effect of a synthetic polymer film of an embodiment of the present invention were examined using a slice of meat in the case where the meat was in direct contact with the synthetic polymer film. The evaluation of the microbicidal effect was carried out through the following procedure.

1. A refrigerant was placed in an expanded polystyrene container, and a cutting board was placed on the refrigerant. A spreading slice of pork was placed on the cutting board sufficiently cooled by the refrigerant. The meat slice (pork ham slice) used was a product processed and bought at the day of the experiment (two days before the expiration date).

2. A 4 cm×4 cm PET film (mold) was placed on the meat slice, and the meat slice was cut into a piece of 4 cm×4 cm. To carry out the experiment under as uniform conditions as possible, the piece was cut out from a low-fat portion of the meat slice.

3. The meat slice was sandwiched by two 5 cm×5 cm sheets of sample film No. 12. In this sandwiching step, raised portions of the sample film sheets opposed each other such that the raised portions were in contact with the meat slice. In order that the results after the samples were left for two different time periods (0 hour (5 minutes) and 24 hours) were examined in three samples for each time period, six samples in total were prepared for sample film No. 12. Likewise, six samples were prepared for sample film No. 13.

The procedure of steps 1 to 3 was carried out with the meat being cooled in an expanded polystyrene container in which a refrigerant was placed. This is because the temperature of the meat is prevented from increasing during the procedure.

4. Each sample was put in an acrylic container, and the acrylic container was sealed in a Ziploc™ freezer bag (manufactured by Asahi Kasei Home Products Corporation), and was left in a refrigerator (2° C. to 5° C.) for a predetermined time period. To prevent drying of the samples, absorbent cotton wetted with 2 mL sterilized water was placed in the acrylic container, and two kimtowels wetted with 30 mL sterilized water was placed in the freezer bag.

5. After having been left for the predetermined time periods (0 hour (5 minutes) and 24 hours), the number of bacteria was counted through the following steps 6 to 8.

6. 10 mL sterilized water was poured in each of two types of filter bags. The sterilized water was cooled in a refrigerator beforehand. The samples of sample films No. 12 and No. 13 were disassembled. The meat slice was put into one of the filter bags. The two film sheets were put into the other filter bags.

7. The film sheets and the meat were rubbed with hands over the filter bags to sufficiently wash away the bacteria from the film sheets and the meat. The solution in the filter bag in which the bacteria was washed away from the meat is referred to as "bacterial dilution A3", and the solution in the filter bag in which the bacteria was washed away from the film sheets is referred to as "bacterial dilution A4".

8. The bacterial dilution A3 and the bacterial dilution A4 were diluted stepwise in the same way as in Experiment 1 to Experiment 4. Note that, however, in Experiment 5, sterilized water was used for dilution. A 1 mL drop of the resultant dilution was placed on a Petrifilm™ medium (product name: Aerobic Count Plate (AC), manufactured by 3M). The bacteria were cultured at 36° C. with the relative humidity of 100%. After 48 hours, the number of bacteria in the bacterial dilution A3 and the bacterial dilution A4 was counted.

Note that, although in JIS Z2801 5.6 h) a phosphate-buffered saline is used in preparation of a diluted solution, sterilized water was used in Experiment 5. When sterilized water is used, there is a probability that the difference in osmotic pressure between the solution in the cells of microorganism and the sterilized water, rather than the physical structure and chemical properties at the surface of the sample films, will be a cause of death of bacteria. As for this probability, it was verified that bacteria did not die on sample film No. 13 (PET). It was verified that the microbicidal effect of the surface of the sample films can be examined even when sterilized water is used.

Figure 12:
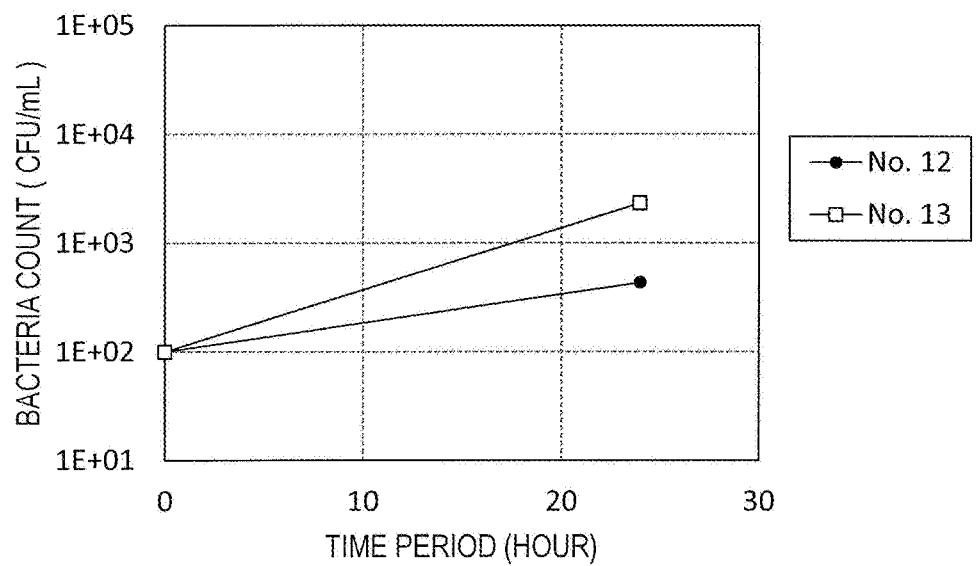
FIGS. 12(a) and (b) are graphs showing the results of evaluation of the microbicidal ability of sample films No. 12 and No. 13. The horizontal axis represents the time period for which the samples were left (hour), and the vertical axis represents the bacteria count (CFU/mL).
Figure 12:
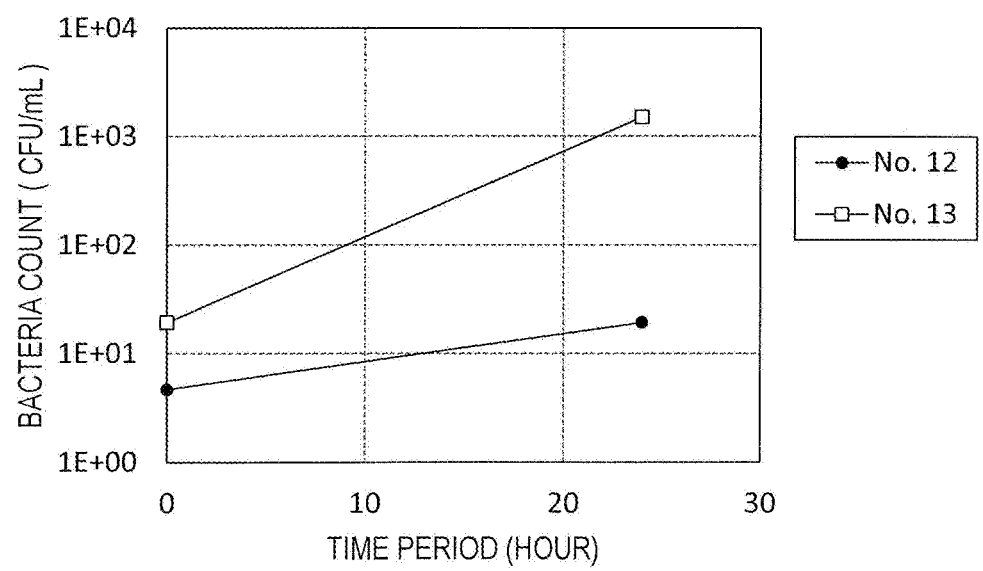

The results are shown in FIGS. 12(a) and 12(b). FIGS. 12(a) and 12(b) are graphs showing the results of evaluation of the microbicidal effect of sample films No. 12 and No. 13. In FIG. 12(a), the horizontal axis represents the time period for which the samples were left (hour), and the vertical axis represents the bacteria count in the bacterial dilution A3 (CFU/mL). In FIG. 12(b), the horizontal axis represents the time period for which the samples were left (hour), and the vertical axis represents the bacteria count in the bacterial dilution A4 (CFU/mL).

Here, of each of sample films No. 12 and No. 13, the results obtained after the respective time periods were examined in three samples. FIGS. 12(a) and 12(b) show the average for values obtained from three samples. The obtained specific values are as follows. In sample film No. 12, the bacteria count values obtained after having been left for 0 hour (5 minutes) were each less than 1.0E+02 CFU/mL, and the bacteria count values obtained after having been left for 24 hours were 3.0E+02 CFU/mL, 8.0E+02 CFU/mL and 2.0E+02 CFU/mL. In sample film No. 13, the bacteria count values obtained after having been left for 0 hour (5 minutes) were each less than 1.0E+02 CFU/mL, and the bacteria count values obtained after having been left for 24 hours were 2.0E+03 CFU/mL, 4.0E+03 CFU/mL and 1.0E+03 CFU/mL.

It is seen from FIGS. 12(a) and 12(b) that, in sample film No. 12, the increase of the bacteria count was suppressed as compared with sample film No. 13. It is seen from FIG. 12(a) that the increase of bacteria contained in the meat slice (including bacteria adhering to the surface of the meat slice) was suppressed. It is seen from FIG. 12(b) that the increase of bacteria adhering to the sample film which was in direct contact with the meat slice was suppressed.

(Experiment 6)

In Experiment 6, the microbicidal effect and the antimicrobial effect of a synthetic polymer film of an embodiment of the present invention were examined in the case where the synthetic polymer film was brought into direct contact with meat and left for predetermined periods. The evaluation of the microbicidal effect was carried out through the following procedure.

1. A plastic wrap was spread over a table, and a spreading slice of pork was placed on the plastic wrap.

2. 3 cm×3 cm pieces of sample films No. 12 and No. 13 were placed on the meat slice and left for 10 minutes at a normal temperature (room temperature). In this step, the sample film pieces were placed such that raised portions of the sample film pieces were in contact with the meat slice. In order that the results after the samples were left for two different time periods (0 hour (5 minutes) and 6 hours) were examined in one sample for each time period, two samples in total were prepared for sample film No. 12, and two samples in total were prepared for sample film No. 13.

3. Thereafter, the pieces of sample films No. 12 and No. 13 were peeled off from the meat slice and then put into an acrylic container such that a side of the film pieces which had been in contact with the meat slice faced upward.

4. The number of bacteria in the post-wash solution was counted through the same procedure as that of steps 4 to 8 of Experiment 5.

Figure 13:
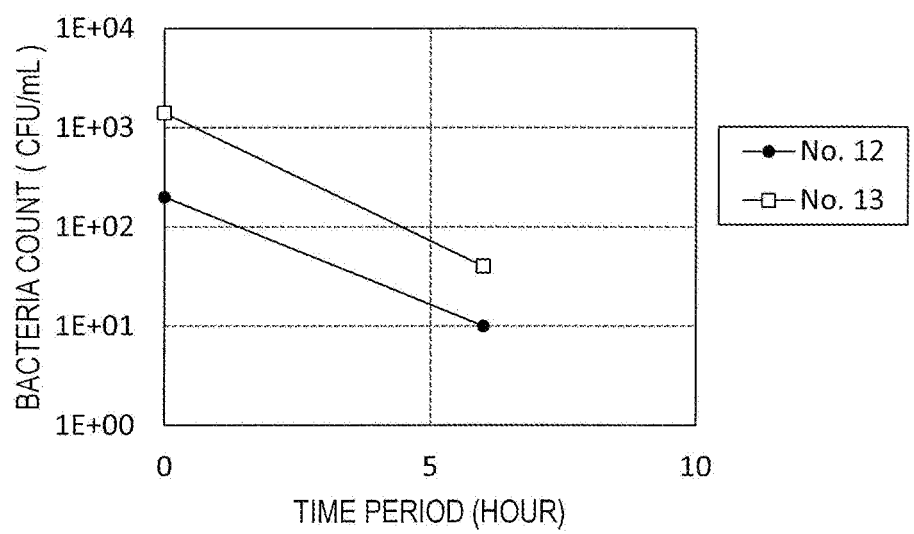
FIG. 13 Graph showing the results of evaluation of the microbicidal ability of sample films No. 12 and No. 13. The horizontal axis represents the time period for which the samples were left (hour), and the vertical axis represents the bacteria count (CFU/mL).

The results are shown in FIG. 13. FIG. 13 is a graph showing the results of evaluation of the microbicidal effect of sample films No. 12 and No. 13. The horizontal axis represents the time period for which the samples were left (hour), and the vertical axis represents the bacteria count in the post-wash solution (CFU/mL).

As seen from FIG. 13, the bacteria count decreased in sample film No. 12. Note that, however, considering that the bacteria count also decreased in sample film No. 13, there is a probability that, in addition to the microbicidal effect of the surface of sample film No. 12, death due to drying contributed to the decrease of the bacteria count.

It was found from experiments 1 to 6 described in the foregoing that when a synthetic polymer film of an embodiment of the present invention is in direct contact with meat, the synthetic polymer film can suppress the increase of microorganisms contained in the meat (including microorganisms adhering to the surface of the meat). It was also found that the synthetic polymer film can suppress the increase of microorganisms which adhere to the synthetic polymer film when the synthetic polymer film is in direct contact with the meat. Thus, a synthetic polymer film of an embodiment of the present invention can be suitably used as a film for food (food film), which is for use in preserving, wrapping or handling of food.

A food film according to an embodiment of the present invention includes a plurality of raised portions over its surface. When viewed in a direction normal to the food film, the two-dimensional size of the plurality of raised portions is in the range of more than 20 nm and less than 500 nm. The surface has a microbicidal effect.

A food preserving method according to an embodiment of the present invention is a method for preserving food using a food film. The food film includes a plurality of raised portions over its surface. When viewed in a direction normal to the food film, the two-dimensional size of the plurality of raised portions is in the range of more than 20 nm and less than 500 nm. Food is brought into direct contact with the surface.

A food film and a method for preserving food using the food film according to an embodiment of the present invention do not involve using a chemical agent (e.g., sterilant). Thus, it is not necessary to consider the effects of the chemical agent on human body and food. The method for preserving food using the food film according to an embodiment of the present invention does not need much effort to be implemented. (For example, it is not necessary to additionally provide a large machine.) Increase of the cost, time and effort incurred by implementation of the method is suppressed, and the method can be easily implemented. The food film according to an embodiment of the present invention can be manufactured at a low cost. Thus, increase of the cost can be suppressed.

In the above-described experimental examples, the microbicidal effect and/or the antimicrobial effect of a synthetic polymer film of an embodiment of the present invention on bacteria contained in meat (dressed meat) were verified. It is estimated that the bacteria examined in the above-described experimental examples include, of the bacteria contained in the meat, bacteria which can be cultured on the Petrifilm™ medium (product name: Aerobic Count Plate (AC), manufactured by 3M) that was used in the experiments. For example, it is estimated that they include *Salmonella* bacteria, pathogenic *E. coli* (including enterohemorrhagic *E. coli* (e.g., O157)), and *Staphylococcus aureus*. Thus, it is estimated that the microbicidal effect and/or the antimicrobial effect on these bacteria can be produced not only on meat but also other food products. For example, it is estimated that the microbicidal effect and/or the antimicrobial effect can also be produced on *Salmonella* bacteria adhering to dairy products and chicken eggs (including chicken egg shell) and pathogenic *E. coli* adhering to raw vegetables.

When a food film of an embodiment of the present invention is used to preserve or wrap food, raised portions at the surface of the food film are brought into direct contact with the food, whereby increase of bacteria contained in the food (including bacteria adhering to the surface of the food) can be suppressed. It is preferred that the raised portions at the surface of the food film of an embodiment of the present invention are brought into direct contact with the food, and the food is preserved at a temperature not more than 8° C. Further, the food may be preserved with being hermetically sealed (i.e., the food may be preserved in a substantially vacuum state). The period for which the food is preserved includes, for example, several minutes to several days in the case of perishables.

A food film of an embodiment of the present invention is in the form of, for example, a sheet. For example, the food film of an embodiment of the present invention may be attached to the inside (bottom or inner walls) of a container. In this case, a surface of the food film which has no raised portions is attached to the inside of the container. For example, the food film may be adhered to the container. Alternatively, for example, a food film in the form of a sheet is placed on the bottom of the container such that a surface of the food film which has raised portions faces upward, and food is placed on the food film, whereby the raised portions at the surface of the food film can be brought into direct contact with the food. The food film is easily applicable to, for example, sale or preservation of foods (including, for example, vegetables, fruits, meat (dressed meat), aquatic products, dairy products, eggs (chicken eggs), etc., and including perishables and processed foods) placed in a container (including, e.g., tray). When the food film is transparent, the appearance is unlikely to be ruined at the scene of sale or preservation of food.

For example, food may be wrapped with a food film in the form of a sheet according to an embodiment of the present invention. In this case, the raised portions at the surface of the food film are brought into direct contact with the food. For example, the food film can be used as a film for wrapping food (plastic wrap food film). After food is wrapped with the food film of an embodiment of the present invention, the wrapped food may be further wrapped with a known plastic wrap food film. When thus combined with a known plastic wrap food film, the food film of an embodiment of the present invention can be used as a plastic wrap food film which has a microbicidal effect and/or antimicrobial effect irrespective of the stretchability, adhesiveness or strength of the food film of the present invention.

A food film of an embodiment of the present invention is in the form of, for example, a tube or bag and may have an inner microbicidal surface. Food is put into the tube or bag, and the opposite ends of the food film tube or the opening of the food film bag is closed, whereby the food can be hermetically sealed therein. For example, when a base film supporting the food film (see, for example, base film 42A of FIG. 1(a) and base film 42B of FIG. 1(b)) is made of a thermoplastic resin, the opposite ends of the food film tube or the opening of the food film bag can be closed by heat fusion joining (also referred to as "heat melt joining").

Figure 14:
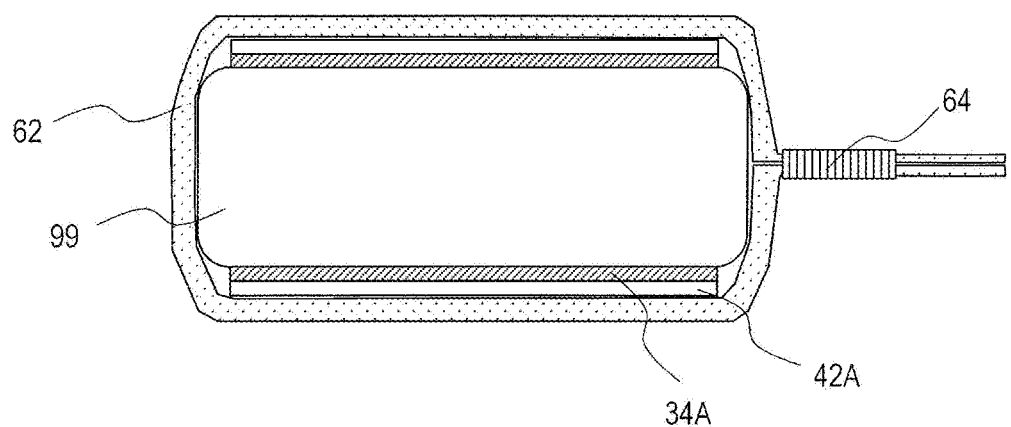
FIG. 14 A schematic cross-sectional view for illustrating an example of a food preserving method of an embodiment of the present invention.

FIG. 14 is a schematic cross-sectional view for illustrating an example of a food preserving method of an embodiment of the present invention. For example, as shown in FIG. 14, food 99 may be preserved with being hermetically sealed using a wrapping film 62 in such a state that the food 99 is in contact with the surface of a food film 34A of an embodiment of the present invention.

The food film 34A has a plurality of raised portions (not shown) over its surface. The configuration of the food film 34A may be the same as, for example, that of the synthetic polymer film 34A shown in FIG. 1(a). The food film 34A may be supported by the base film 42A. As a matter of course, a synthetic polymer film 34B (FIG. 1(b)) may be used as the food film. The state that the food 99 is in contact with the surface of a food film 34A refers to a state where, for example, the raised portions of one or a plurality of sheets of the food film 34A are in contact with the surface of the food 99. At least part of the surface of the food 99 may be wrapped with one or a plurality of sheets of the food film 34A. In this case, the food 99 is wrapped such that the raised portions at the surface of the food film 34A are in contact with the surface of the food 99.

The wrapping film 62 has low water vapor transmission rate and low oxygen permeability. For example, the water vapor transmission rate is less than 10 g/(m$^2$·24 h), and the oxygen permeability is less than 100 ml/(m$^2$·24 h·MPa). The wrapping film 62 is in the form of, for example, a bag or tube. The wrapping film 62 is hermetically closed by a sealing portion 64. The sealing portion 64 can be provided at the opening of the wrapping film bag 62 or the opposite ends of the wrapping film tube 62. The sealing portion 64 is, for example, a melt-joined portion of the wrapping film 62. The sealing portion 64 may be, for example, a known plastic zipper. When the sealing portion 64 is a zipper, the wrapping film 62 can be repeatedly opened and closed. Such a zipper is used in, for example, Ziploc™ freezer bag or Ziploc™ Easy Zipper™ (both manufactured by Asahi Kasei Home Products Corporation). For example, a known film for vacuum packs may be used as the wrapping film 62. For example, a known film for vacuum zipper packs may be used as the wrapping film 62.

As described in the foregoing, a surface of a synthetic polymer film of an embodiment of the present invention has a microbicidal effect. Thus, the present invention is not limited to a film but may be applicable to any object which has a surface that has such a microbicidal effect. For example, a container for food (food container) which has a microbicidal surface over the inner walls or bottom surface can be suitably used for preservation, wrapping and handling of food.

A food container of an embodiment of the present invention has a surface that has a plurality of raised portions over the inner walls or the bottom surface. When viewed in a direction normal to the surface, the two-dimensional size of the plurality of raised portions is in the range of more than 20 nm and less than 500 nm. The surface has a microbicidal effect.

A food preserving method of an embodiment of the present invention is a method for preserving food using a food container. The food container has a surface that has a plurality of raised portions over the inner walls or the bottom surface. When viewed in a direction normal to the surface, the two-dimensional size of the plurality of raised portions is in the range of more than 20 nm and less than 500 nm. The food is brought into direct contact with the surface.

A food container of an embodiment of the present invention includes, for example, a storage container, a tray, etc.

A food film and a food container of an embodiment of the present invention are capable of preventing growth of microorganisms adhering to a surface even when food is left for a predetermined period after the surface is brought into direct contact with the food. Therefore, these can also be suitably used for handling of food. A food handling method of an embodiment of the present invention includes handling food using the food film which has been illustrated in the foregoing or the food container which has been illustrated in the foregoing.

For example, a food film of an embodiment of the present invention can be used as an antimicrobial sheet which is to be placed over a table or cutting board on which food is to be handled, a shelf on which food or tableware are to be placed, a kitchen counter and surrounding facilities, or a plate on which washed tableware are to be dried, in a place where food is handled, such as a meat packing house, a kitchen in a restaurant or grocery store, etc. For example, a food container of an embodiment of the present invention may also be used as a work container (work tray). For example, a glove for handling food can be manufactured using a food film of an embodiment of the present invention. The aforementioned examples are not limited to industrial uses but, as a matter of course, applicable to household uses. It is preferred from a sanitary viewpoint that a food film and a food container for use in handling of food (particularly, perishables) are replaced every time they are used. A food film and a food container of an embodiment of the present invention can be manufactured inexpensively and are therefore suitably applicable to disposable uses.

INDUSTRIAL APPLICABILITY

A food preserving method of an embodiment of the present invention is capable of preventing growth of microorganisms adhering to or mixed in food. A food film and a food container of an embodiment of the present invention are applicable to various uses, including preservation, wrapping and handling of food. A food film and a food container of an embodiment of the present invention can be manufactured inexpensively.

REFERENCE SIGNS LIST 34A, 34B synthetic polymer film (food film)
34Ap, 34Bp raised portion
42A, 42B base film
50A, 50B film
100, 100A, 100B moth-eye mold

The invention claimed is:
1. A food film having a surface comprising:
a plurality of first raised portions, wherein:
a two-dimensional size of the plurality of first raised portions is in a range of more than 20 nm and less than 500 nm when viewed in a direction normal to the food film;
a plurality of second raised portions is superimposedly formed over the plurality of first raised portions;

a two-dimensional size of the plurality of second raised portions is smaller than the two-dimensional size of the plurality of first raised portions and does not exceed 100 nm;

the plurality of first raised portions includes a first raised portion on which two or more second raised portions of the plurality of second raised portions are formed; and the surface has a microbicidal effect.

2. The food film of claim 1, wherein a static contact angle of the surface with respect to hexadecane is not more than 51°.

3. The food film of claim 1, wherein the concentration of nitrogen element included in the surface is not less than 0.7 at %.

4. The food film of claim 1, wherein the plurality of second raised portions include a generally conical portion.

5. The food film of claim 1, wherein a height of the plurality of second raised portions is more than 20 nm and not more than 100 nm.

6. A food container having a surface comprising:

a plurality of first raised portions over an inner wall or bottom surface, wherein:

a two-dimensional size of the plurality of first raised portions is in a range of more than 20 nm and less than 500 nm when viewed in a direction normal to the surface;

a plurality of second raised portions is superimposedly formed over the plurality of first raised portions;

a two-dimensional size of the plurality of second raised portions is smaller than the two-dimensional size of the plurality of first raised portions and does not exceed 100 nm;

the plurality of first raised portions includes a first raised portion on which two or more second raised portions of the plurality of second raised portions are formed; and the surface has a microbicidal effect.

7. The food container of claim 6, wherein a static contact angle of the surface with respect to hexadecane is not more than 51°.

8. The food container of claim 6, wherein the concentration of nitrogen element included in the surface is not less than 0.7 at %.

9. The food container of claim 6, wherein the plurality of second raised portions include a generally conical portion.

10. The food container of claim 6, wherein a height of the plurality of second raised portions is more than 20 nm and not more than 100 nm.

11. A method for preserving food using the food film as set forth in claim 1, the method comprising bringing the food into direct contact with the surface of the food film.

12. The method of claim 11, wherein the food film is in the form of a sheet.

13. The method of claim 11, wherein the food film is in the form of a tube or bag and has the surface inside the tube or bag.

14. The method of claim 11, wherein the food is hermetically preserved.

15. The method of claim 11, wherein the food is hermetically preserved in a wrapping film whose water vapor transmission rate is less than 10 g/(m$^2$·24 h) and whose oxygen permeability is less than 100 ml/(m$^2$·24 h·MPa) in such a state that the food is in direct contact with the surface of the food film.

16. The method of claim 11, wherein a static contact angle of the surface with respect to hexadecane is not more than 51°.

17. The method of claim 11, wherein the concentration of nitrogen element included in the surface is not less than 0.7 at %.

18. A method for preserving food using the food container as set forth in claim 6, the method comprising bringing the food into direct contact with the surface of the food container.

19. The method of claim 18, wherein the food is hermetically preserved.

20. The method of claim 18, wherein the food is hermetically preserved in a wrapping film whose water vapor transmission rate is less than 10 g/(m$^2$·24 h) and whose oxygen permeability is less than 100 ml/(m$^2$·24 h·MPa) in such a state that the food is in direct contact with the surface of the food container.

21. The method of claim 18 wherein a static contact angle of the surface with respect to hexadecane is not more than 51°.

22. The method of claim 18, wherein the concentration of nitrogen element included in the surface is not less than 0.7 at %.

* * * * *